US008832745B2

(12) United States Patent
Stallings et al.

(10) Patent No.: US 8,832,745 B2
(45) Date of Patent: Sep. 9, 2014

(54) USER INTERFACES FOR FACILITATING ACCESS TO MEDIA CONTENT LISTINGS

(75) Inventors: Heath Stallings, Colleyville, TX (US); Daniel S. Dunnam, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 371 days.

(21) Appl. No.: 12/896,682

(22) Filed: Oct. 1, 2010

(65) Prior Publication Data
US 2012/0060188 A1    Mar. 8, 2012

Related U.S. Application Data

(60) Provisional application No. 61/380,120, filed on Sep. 3, 2010.

(51) Int. Cl.
*H04N 5/445* (2011.01)
*H04N 21/422* (2011.01)

(52) U.S. Cl.
CPC ..... *H04N 21/4222* (2013.01); *H04N 21/42209* (2013.01); *H04N 21/42224* (2013.01)
USPC ............................................. 725/52; 725/44

(58) Field of Classification Search
USPC ..................................................... 725/44, 52
See application file for complete search history.

(56) References Cited

U.S. PATENT DOCUMENTS

| | | | | |
|---|---|---|---|---|
| 6,025,869 | A | * | 2/2000 | Stas et al. .......................... 725/28 |
| 7,900,228 | B2 | * | 3/2011 | Stark et al. ....................... 725/45 |
| 7,962,936 | B2 | * | 6/2011 | Fukuda et al. ................... 725/43 |
| 8,572,649 | B1 | * | 10/2013 | Gossweiler et al. ............ 725/39 |
| 8,601,508 | B2 | * | 12/2013 | White et al. ..................... 725/39 |
| 2002/0087982 | A1 | * | 7/2002 | Stuart .............................. 725/39 |
| 2006/0015900 | A1 | * | 1/2006 | Cezeaux et al. ................. 725/40 |
| 2009/0113478 | A1 | * | 4/2009 | Haughawout et al. .......... 725/40 |
| 2009/0144777 | A1 | * | 6/2009 | Mikami et al. .................. 725/50 |
| 2011/0247039 | A1 | * | 10/2011 | Cheng et al. .................... 725/52 |
| 2011/0271304 | A1 | * | 11/2011 | Loretan et al. .................. 725/41 |

\* cited by examiner

*Primary Examiner* — Chris Parry

(57) ABSTRACT

An exemplary method includes a media content information system displaying, on a touch screen display, a first set of media content listings, a graphical representation of a timeline indicating a plurality of times, and a graphical selector to indicate a first position on the timeline, the first position corresponding to a first time within the plurality of times, detecting, a touch input provided by a user on the touch screen display to indicate a second position on the timeline, repositioning, in response to the touch input, the graphical selector to indicate the second position on the timeline, the second position corresponding to a second time within the plurality of times, identifying, a second set of media content listings associated with the second time, and dynamically replacing, the first set of media content listings with the second set of media content listings on the touch screen display.

24 Claims, 18 Drawing Sheets

USER INTERFACES FOR FACILITATING ACCESS TO MEDIA CONTENT LISTINGS

RELATED APPLICATIONS

The present application claims priority under 35 U.S.C. §119(e) to U.S. Provisional Patent Application No. 61/380,120 by Heath Stallings et al., filed on Sep. 3, 2010, and entitled USER INTERFACES FOR FACILITATING ACCESS TO MEDIA CONTENT LISTINGS, the contents of which are hereby incorporated by reference in their entirety.

BACKGROUND INFORMATION

Advances in electronic communications technologies have expanded the accessibility of media content. To illustrate, personal computers, handheld devices, mobile phones, gaming consoles, set-top box devices, and other electronic access devices are increasingly being used to access, store, download, share, and/or otherwise process various types of media content (e.g., video, audio, photographs, and/or multimedia).

The increased availability of media content has challenged designers of user interfaces for devices capable of accessing media content and/or information about media content. For example, a common challenge has been to design and implement user interfaces that provide an appropriate balance of information, usability, intuitiveness, control, and functionality that promotes a quality experience for a user attempting to find and/or access media content that is relevant and/or of interest to the user. While user interface technologies have made significant advances in this regard, there remains room for improvement. For instance, there remains room to improve the intuitiveness and/or usability of user interfaces that are designed to be used by a user of a device to access information about media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
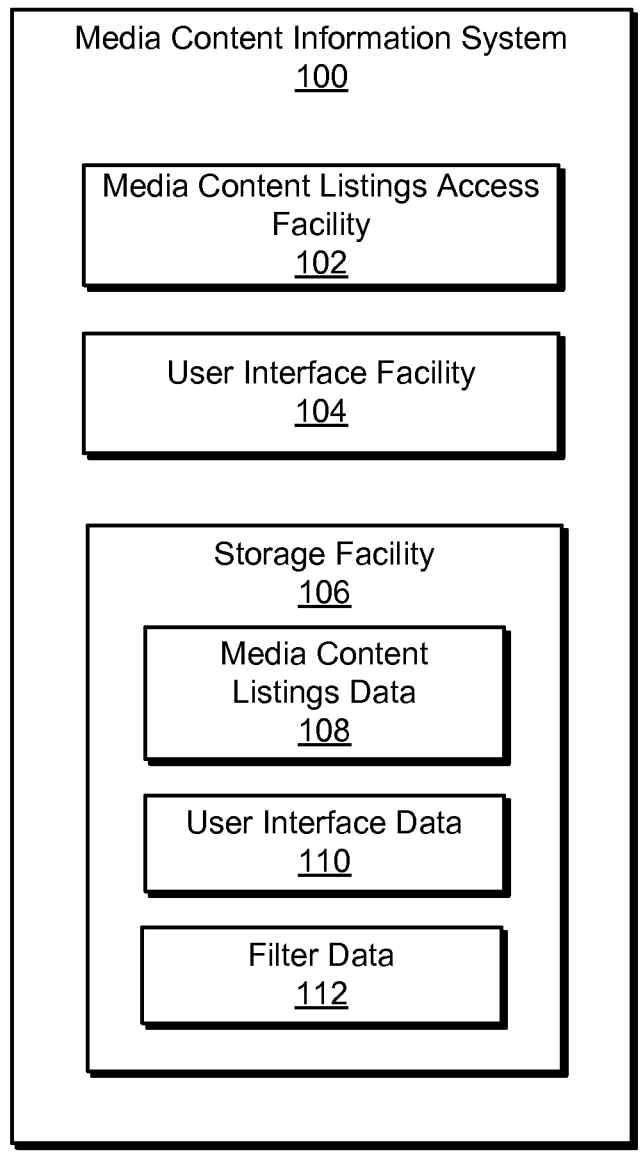
FIG. 1 illustrates an exemplary media content information system according to principles described herein.

Exemplary user interfaces for facilitating access to media content listings are described herein. An exemplary user interface may be configured to provide one or more filter tools with which a user may intuitively and/or conveniently interact to initiate access to a filtered set of media content listings for presentation by the user interface. For example, a time filter tool may be provided and may include a graphical representation of a timeline displayed in a graphical user interface ("GUI") on a touch screen display. A user may provide touch input on the touch screen display to indicate a position on the timeline. In certain examples, the touch input may include a touch gesture that slides a graphical selector displayed together with the timeline to the position on the timeline. The selected position on the timeline may correspond to a time within a plurality of times represented by the timeline. In response to a detection of the touch input indicating the position on the timeline, a set of media content listings associated with the time corresponding to the position on the timeline may be identified and displayed in the GUI. The identification of the set of media content listings associated with the time may be performed by identifying one or more time filter parameters based on the time and using the time filter parameter(s) to filter an overall set of media content listings (e.g., a library of media content listings data) to identify the set of media content listings that matches the time filter parameter(s).

The identified set of media content listings may represent a set of media content programs that are associated with the time corresponding to the position on the timeline. For example, the media content listings may represent most popular media content programs associated with the time (e.g., a set of most popular media content programs at the time), media content programs transmitted or scheduled for transmission at one or more times associated with the time, and/or media content programs transmitted or scheduled for transmission by a particular content provider and/or over a particular media content carrier channel at one or more times associated with the time. Data representative of the identified set of media content listings may be displayed in the GUI for consideration by the user.

As used herein, the term "media content program" (or simply "program") may refer to any television program (e.g., a television program transmitted, being transmitted, or scheduled for future transmission by a content provider and/or a recording (e.g., a DVR recording) of a transmitted television program), on-demand media program, pay-per-view media program, broadcast media program (e.g., broadcast television program), multicast media program, narrowcast media program, IPTV program, video program, audio program, streamed media program, movie, podcast (e.g., audio and/or video podcast), media feed, (e.g., audio and/or video feed), music files, images (e.g., photographs, or any other discrete instance of media content that may be accessed and/or presented by one or more media content processing devices for experiencing by a user.

As used herein, the term "media content listing" may refer to any representation of a media content program. The representation may include one or more graphics and/or information descriptive of or otherwise associated with the media content program. For example, a media content listing may indicate a name of the program, a source of the program (e.g., a content provider), a genre of the program, a description of the program, a channel by which the program is transmitted and/or accessed, a popularity of the program, a time associated with the program (e.g., a time the program was transmitted, a scheduled future transmission time of the program, and/or a time of recording of the program), an image associated with the program (e.g., a thumbnail image associated with the media content program and/or a source of the media content program), and/or any other information associated with the media content program. In certain embodiments, media content listings may include listings for scheduled transmissions of media programs (e.g., a television programming schedule), listings for on-demand media programs, listings of recorded media programs (e.g., recorded transmissions of television programs), listings for most popular media programs (e.g., most-watched television programs at a given time), and any other listings representative of any other media content programs. Examples of GUI views displaying media content listings are described further below.

Exemplary systems, methods, and devices associated with user interfaces for facilitating access to media content listings will now be described in reference to the drawings.

FIG. 1 illustrates an exemplary media content information system 100 (or simply "system 100"). As shown, system 100 may include, without limitation, a media content listings access facility 102 (or simply "access facility 102"), a user interface facility 104, and a storage facility 106 selectively and communicatively coupled to one another. Any suitable communication technologies, including any of the communication technologies mentioned herein, may be employed to facilitate communications between facilities 102-106. Each of these facilities will now be described in more detail.

Access facility 102 may be configured to access data representative of information about or otherwise related to media content, such as data representative of one or more media content listings representing one or more media content programs. Access facility 102 may be configured to access media content listings from any suitable source or combination of sources configured to provide media content listings, including one or more local data stores, remote data stores, server devices, media content processing devices, information feeds, media content information services (e.g., electronic program guide data services), and/or any other sources of media content listings.

User interface facility 104 may be configured to perform one or more of the user interface operations described herein, including providing output to and/or receiving input from a user. For example, user interface facility 104 may be configured to provide output by generating and providing one or more GUIs for display, including any of the exemplary GUIs described herein. Generation and display of a GUI may include rendering one or more graphical objects included in the GUI. In certain embodiments, a GUI including one or more graphical objects representing one or more filter tools configured to facilitate access to filtered media content listings may be displayed on a touch screen display. Examples of such GUIs and filter tools are described further below.

User interface facility 104 may be further configured to receive user input by way of a touch screen display. For example, predefined touch input provided by a user on a touch screen display may be detected by user interface facility 104. Predefined touch input may include any touch screen input that may be provided by user and detected by way of a touch screen display. In certain examples, touch input may include one or more predefined touch gestures that may be provided by a user and detected by way of a touch screen display. Touch input, such as one or more touch gestures, may be provided by a user in relation to one or more filter tools in a GUI to interact with the filter tools. Examples of predefined touch input used to interact with filter tools are described further below.

Based on touch input provided by a user, user interface facility 104 may determine one or more filter parameters to use to identify a filtered set of media content listings for display in a GUI. The determination may be made in any suitable way. As an example, user interface facility 104 may apply the filter parameters to an overall set of media content listings accessed by access facility 102 to identify and display a filtered set of media content listings that match the filter parameters. As another example, user interface facility 104 may provide one or more filter parameters to access facility 102, which may utilize the filter parameters to identify and access, from an overall set of media content listings, data representative of a filtered set of one or more media content listings. Access facility 102 may provide this data to user interface facility 104, which may use the data to display the filtered set of media content listings in a GUI on the touch screen display.

Storage facility 106 may be configured to store media content listings data 108 representative of one or more media content programs. Media content listings data 108 may include any media content listings data accessed by and/or accessible to access facility 102. Storage facility 106 may be further configured to store user interface data 110 representative of a GUI displayed and/or user input received by user interface facility 104. Storage facility 106 may be further configured to store filter data 112 representative of one or more filter parameters used or to be used to identify a set of one or more media content listings that match the filter parameters. It will be recognized that storage facility 106 may maintain additional or alternative data as may serve a particular application.

Figure 2:
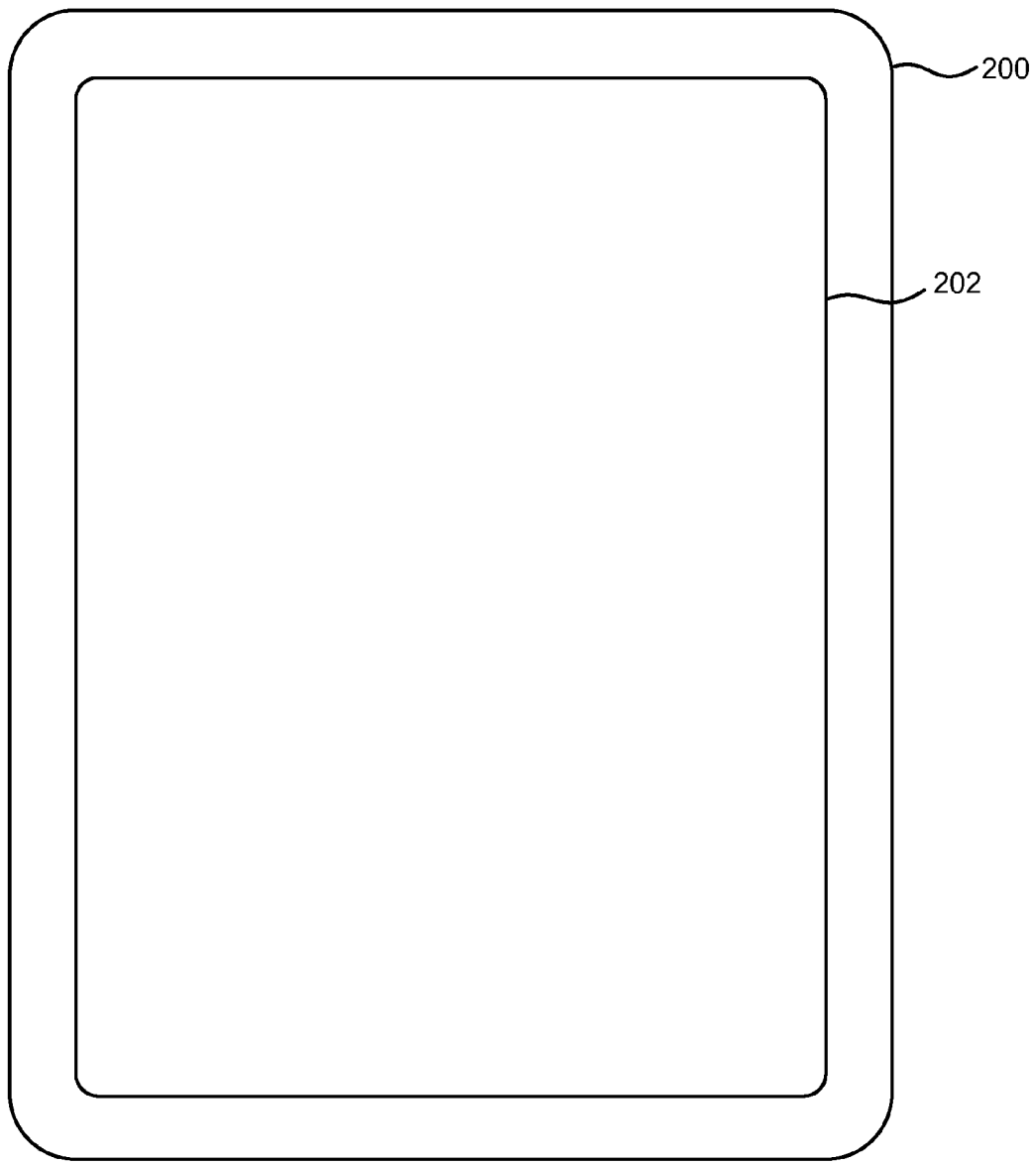
FIG. 2 illustrates an exemplary device implementing the system of FIG. 1 according to principles described herein.

System 100 may be implemented by one or more devices capable of accessing and displaying media content listings and of detecting touch input provided by a user. For example, FIG. 2 illustrates an exemplary device 200 having system 100 implemented thereon. Device 200 may include one or more of the facilities 102-106 shown in FIG. 1 and may be configured to perform one or more of the processes and/or operations described herein. Device 200 may include, but is not limited to, a mobile device (e.g., a mobile phone device, smart phone device, tablet computing device, laptop computer, netbook device, etc.), media processing device, computer, gaming device, phone device (e.g., Verizon Hub device), personal-digital assistant, and/or any other device capable of accessing and displaying media content listings and of detecting touch input provided by a user.

As shown in FIG. 2, device 200 may include a touch screen display 202 configured to display one or more GUIs for viewing by a user of device 200 and to detect user input provided by a user by way of the touch screen display. Touch screen display 202 may be included in or otherwise interfaced with user interface facility 104 and may include single-touch and/or multi-touch touch screen technologies. Examples of GUIs that may be displayed on touch screen display 202 are described in detail further below.

Figure 3:
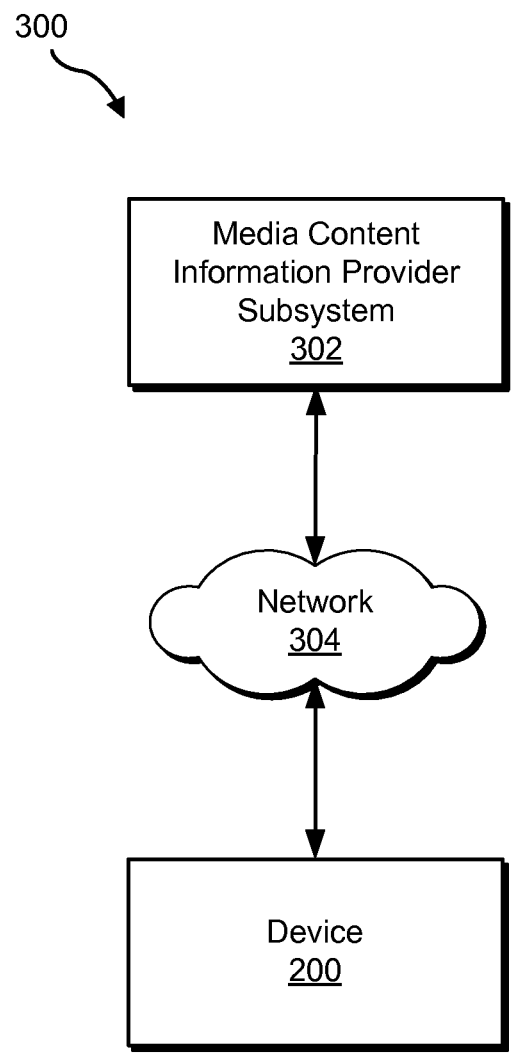
FIGS. 3-5 illustrate exemplary implementations of the system of FIG. 1 according to principles described herein.

While FIG. 2 illustrates an exemplary implementation of system 100, system 100 may be implemented in other ways. For example, FIG. 3 illustrates an exemplary implementation 300 of system 100. As shown in FIG. 3, implementation 300 may include device 200 configured to communicate with a media content information provider subsystem 302 (or simply "provider subsystem 302") by way of a network 304. In implementation 300, any of facilities 102-106 of system 100 may be implemented by access device 200, provider subsystem 302, or distributed across access device 200 and provider subsystem 302.

Provider subsystem 302 and device 200 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Global System for Mobile Communications ("GSM") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), Code Division Multiple Access ("CDMA") technologies, in-band and out-of-band signaling technologies, and other suitable communications technologies.

Network 304 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between device 200 and provider subsystem 302. Communications between device 200 and provider subsystem 302 may be transported using any one of the above-listed networks, or any combination or sub-combination of the above-listed networks. Alternatively, device 200 and provider subsystem 302 may communicate in another way such as by one or more direct connections between device 200 and provider subsystem 302.

Device 200 may be configured to access media content listings data from provider subsystem 302 by way of network 304 in any suitable way. In some examples, device 200 may be configured to access media content listings data from provider subsystem 302 in an ad hoc manner as needed by one or more applications running on device 200. Additionally or alternatively, device 200 may be configured to periodically access media content listings data from provider subsystem 302 (e.g., as part of a nightly background process) for local storage and use by device 200.

Provider subsystem 302 may include one or more computing devices configured to access, maintain, and/or provide media content listings data. In certain examples, provider subsystem 302 may include one or more server devices configured to provide media content listings data as part of a service. In other examples, provider subsystem 302 may include one or more media content processing devices (e.g., a set-top-box device, DVR device, television, gaming console, personal media player, etc.) capable of accessing and presenting media content for experiencing by an end user of a media service. In other examples, provider subsystem 302 may include a combination of one or more server devices configured to provide media content listings data as part of a service and one or more media content processing devices capable of accessing and presenting media content for experiencing by an end user of a media service. In such examples, access device 200 may be configured to access media content listings data from one or more server devices and/or from one or more media content processing devices.

Figure 4:
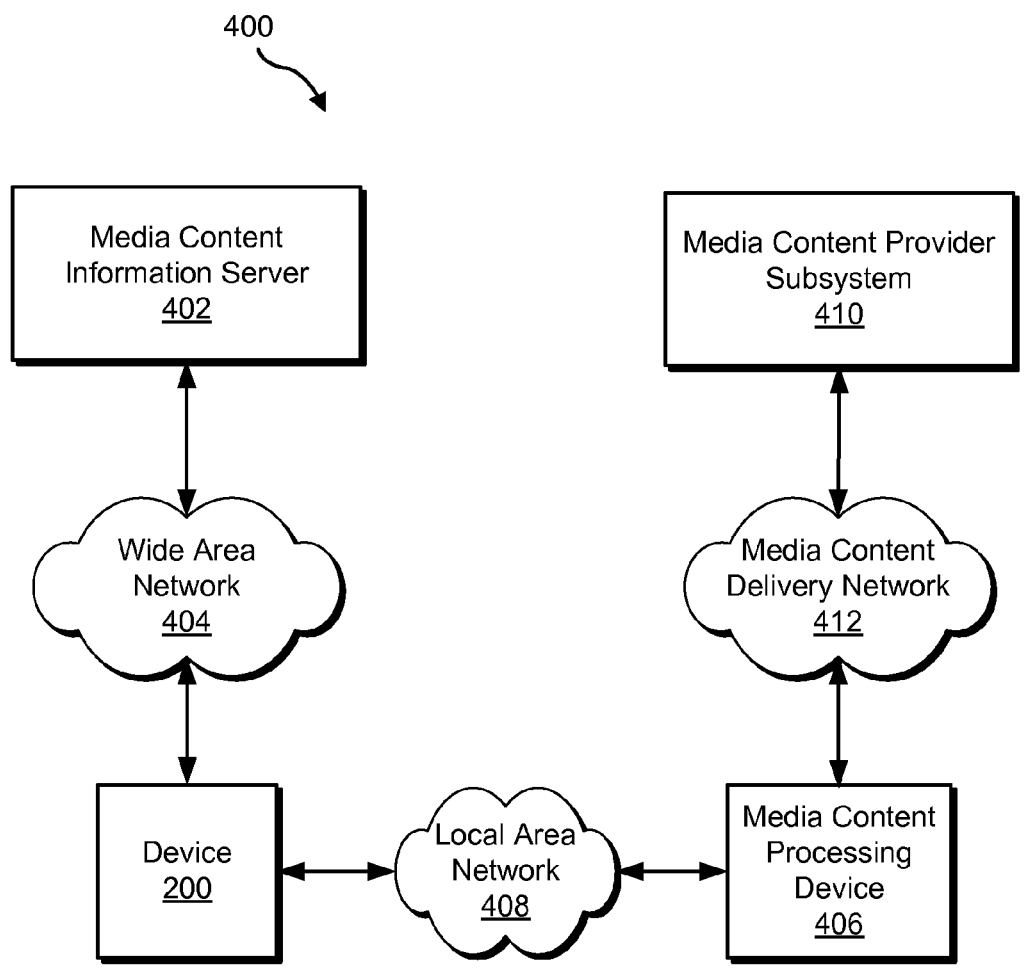

To illustrate, FIG. 4 shows another exemplary implementation 400 in which access device 200 may be communicatively coupled to a media content information server 402 by way of a wide area network 404 (e.g., the Internet, a subscriber television network, a wireless mobile phone data network, etc.) and to a media content processing device 406 by way of a local area network 408 (e.g., a home LAN, a Wi-Fi network, a Bluetooth network connection, etc.). Accordingly, access device 200 may be configured to access media content listings data from media content information server 402 and/or from media content processing device 406.

Media content processing device 406 may include any device configured to access media content from a media content provider subsystem 410 by way of a media content delivery network 412 for processing and presentation to a user. Media content processing device 406 may include, but is not limited to, a set-top-box device, a DVR device, a computer, a television, a personal media player device, and/or any other device capable of accessing, processing, and presenting media content for presentation to a user.

In certain examples, media content processing device 406 may be further configured to access and store media content listings data. For example, media content processing device 406 may access media content listings data associated with a finite time period from one or more sources and store the data for local use by media content processing device 406. Media content processing device 406 may also be configured to generate media content listings data and/or information to be associated with media content listings data (e.g., information indicating when media content processing device 406 recorded a television program).

Media content processing device 406 and media content provider subsystem 410 may communicate by way of media content delivery network 412 using any suitable communication technologies, devices, networks, media, and protocols supportive of remote data communications, including any of those mentioned herein. Media content delivery network 412 may include one or more networks or types of networks (and communication links thereto) capable of carrying communications, media content, and/or data signals between media content provider subsystem 410 and media content processing device 406. For example, network 412 may include, but is not limited to, one or more wireless networks (e.g., satellite media broadcasting networks or terrestrial broadcasting networks), mobile phone data networks, subscriber television networks (e.g., broadcast, multicast, and/or narrowcast television networks), video delivery networks, satellite networks, cable networks, hybrid fiber coax networks, optical fiber networks, broadband networks, narrowband networks, the Internet, wide area networks, and any other networks capable of carrying data and/or communications signals between media content provider subsystem 410 and media content processing device 406. Communications between media content provider subsystem 410 and media content processing device 406 may be transported using any one of above-listed networks, or any combination or sub-combination of the above-listed networks.

Media content provider subsystem 410 may include one or more devices configured to provide one or more media services to media content processing device 406, including transmitting data representative of media content over network 412. In certain embodiments, media content provider subsystem 410 may be configured to transmit television programming content over network 412 in accordance with a transmission schedule. Additionally or alternatively, media content provider subsystem may be configured to transmit media content on-demand. In certain implementations, media content provider subsystem 410 may include one or more video head-end and/or video hub office ("VHO") devices, and network 412 may include a subscriber television network.

Figure 5:
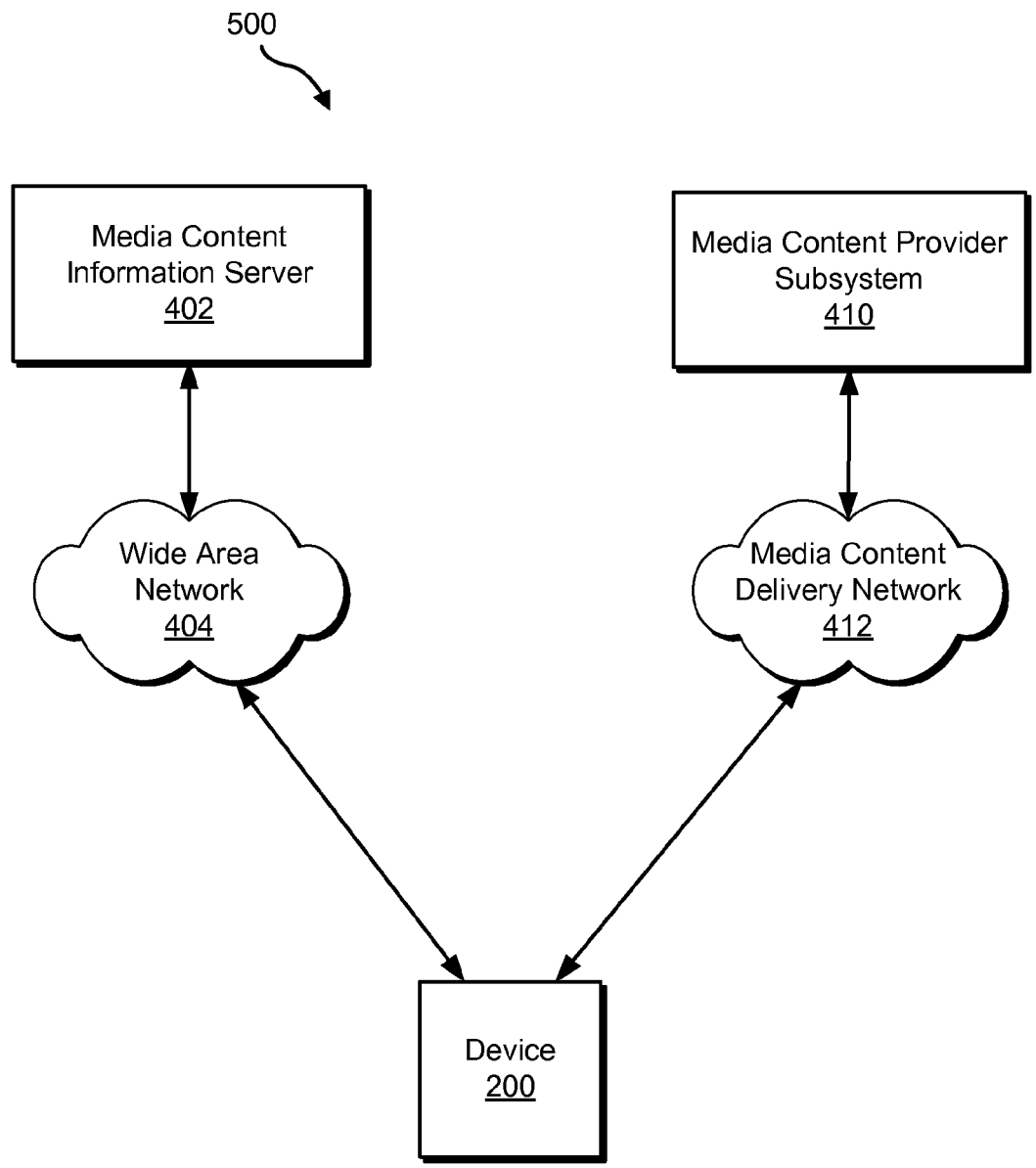

In certain implementations, device 200 may be further configured to access, process, and present media content for experiencing by a user. FIG. 5 illustrates another exemplary implementation 500 in which device 200 is configured to access media content listings data from media content information server 402 by way of wide area network 404 and media content from media content provider subsystem 410 by way of media content delivery network 412.

FIGS. 6-15 illustrate exemplary GUI views that may be generated by system 100 and/or a device implementing system 100 (e.g., device 200). The GUI views illustrate examples of displayed media content listings and one or more filter tools with which a user may interact to access filtered media content listings for display.

Figure 6:
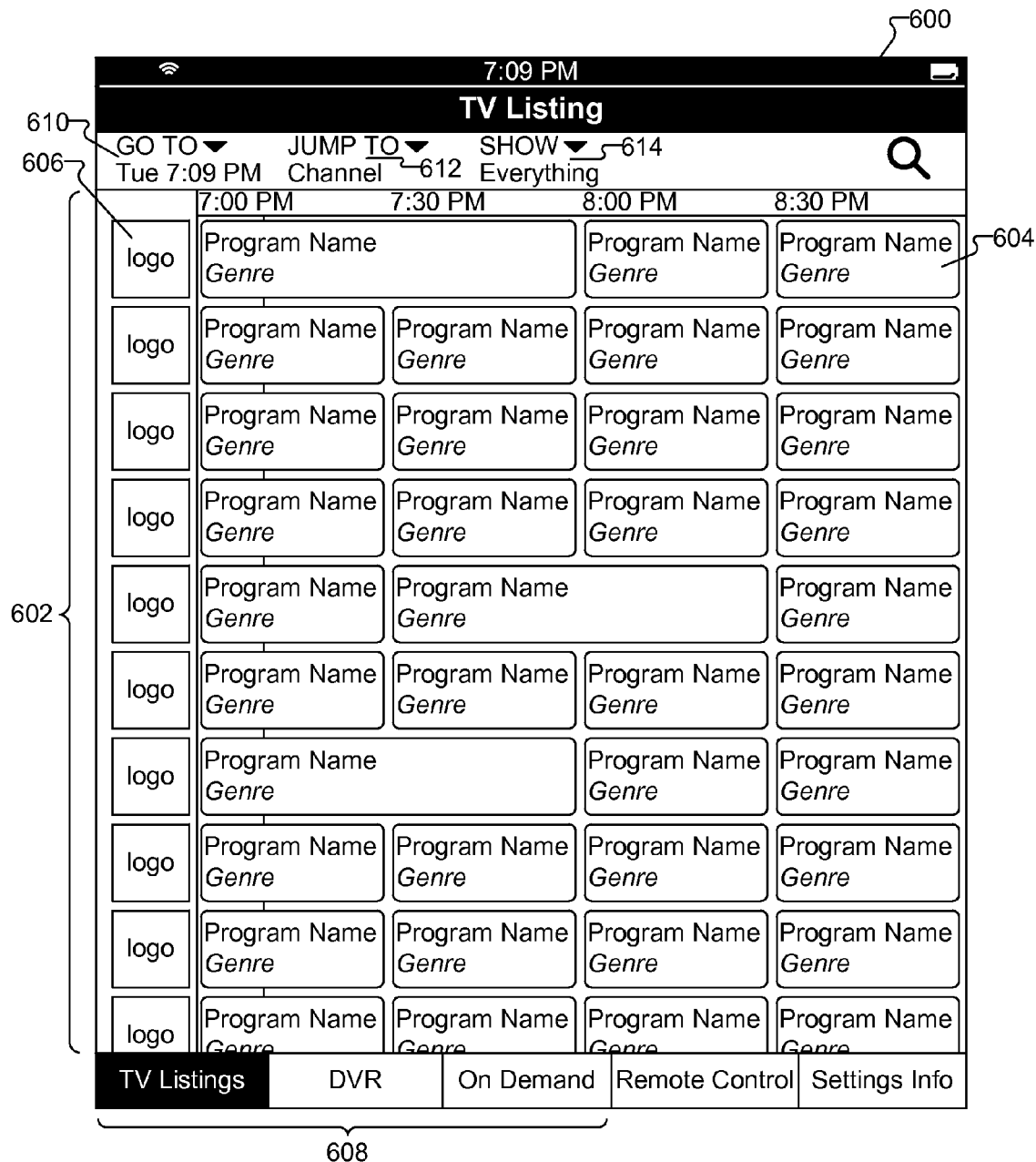
FIGS. 6-15 illustrate exemplary graphical user interface views that may be displayed on a touch screen display according to principles described herein.

FIG. 6 illustrates a view of a GUI 600 as may be displayed on a touch screen display (e.g., touch screen display 202 of device 200). As shown in FIG. 6, GUI 600 may include a section 602 having media content listings displayed therein. Each media content listing may represent a media content program and may visually indicate information related to the media content program. For example, media content listing 604 indicates a name and genre of a media content program. In addition, the media content listings may be arranged in a grid such that column placement within the grid indicates time slots (e.g., scheduled transmission time slots) associated with the media content programs represented by the media content listings. For example, media content listing 604 is positioned in a column of the grid that corresponds to a time slot that spans a thirty minute time period that begins at 8:30 P.M. Row placement within the grid may indicate sources (e.g., content providers and/or channels) associated with the media content programs represented by the media content listings. For example, a logo image 606 may indicate a content provider that provides media content programs represented by media content listings positioned in the same row as logo image 606. Thus, the media content program represented by media content listing 604 is provided by a content provider indicated by logo image 606.

In addition, GUI 600 may include one or more filter tools displayed therein and with which a user may interact to select and one or more filter parameters to be used to identify media content listings to be displayed in section 602. As shown in FIG. 6, GUI 600 may include a filter tool 608 that allows a user to select a particular type of content for display in section 602. For example, filter tool 608 may include options that may be selected by a user to select listings representing television programs ("TV listings"), listings representing recorded media programs ("DVR"), or listings representing on-demand media programs ("On Demand") for display in section 602. In the illustrated example, the "TV Listings" options is selected such that the media content listings displayed in section 602 include television listings representing television programs (e.g., television programs transmitted and/or scheduled for transmission in accordance with a transmission schedule).

The listings representing the selected type of content may be further filtered by a user interacting with additional filter tools displayed in GUI 600. As shown in FIG. 6, for example, GUI 600 may include a time filter tool 610, a channel filter tool 612, and a category filter tool 614. Each of these filters will now be described in detail.

Time filter tool 610 may be utilized by a user to select one or more time filter parameters to be applied by system 100 to filter media content listings to identify a set of media content listings that match the time filter parameters. For example, the set of media content listings may represent media programs that have transmission time slots, recording times, and/or other time attributes that match the time filter parameters.

Figure 7:
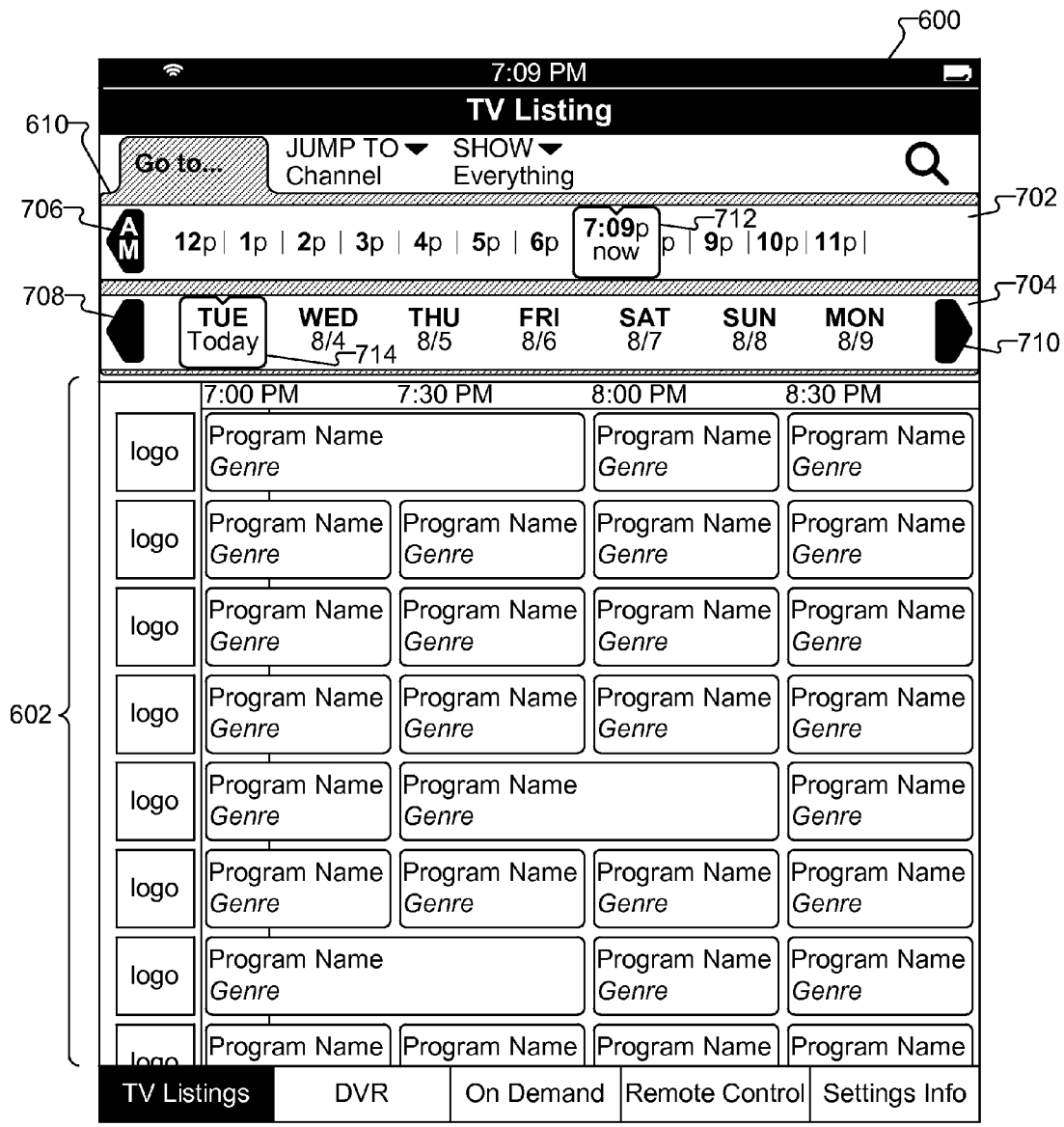

FIG. 7 illustrates another view of GUI 600 that may be displayed and in which time filter tool 610 is launched in response to a user selection of time filter tool 610 shown in FIG. 6. As shown in FIG. 7, section 602 may be resized (e.g., compacted) to allow room for display of the launched time filter tool 610 together with the media content listings included in section 602.

Launched time filter tool 610 may include a graphical representation of one or more timelines. In FIG. 7, time filter tool 610 includes a graphical representation of two timelines—a first timeline 702 indicating a first set of times within a time period and a second timeline 704 indicating a second set of times within another period of time. Each of the timelines 702 and 704 may represent any suitable time period (e.g., twelve hours, a day, a week, etc.) and may indicate any times within the time period. In the illustrated example, timeline 702 indicates a first set of times in the form of times of day (e.g., hours within a day and/or a current time of day) within an approximately twelve hour period of time, and timeline 704 indicates a second set of times in the form of days of a week and corresponding calendar dates within a weeklong period of time.

Each of the timelines 702 and 704 may be scrolled to display a different set of times within the represented time period. For example, a user may select arrow object 706 to trigger a scrolling of times indicated in timeline 702 such that a different set of times (e.g., the first twelve hours of a day instead of the last twelve hours of the day) is indicated in timeline 702. Similarly, a user may select arrow object 708 or arrow object 710 to trigger a scrolling of times (e.g., days and/or dates) indicated in timeline 704 such that a different set of times (e.g., a different set of days and/or dates) is indicated in timeline 704. In certain examples, a user selection of arrow object 708 may trigger a scrolling of times indicated by timeline 704 back in time one week, and a user selection of arrow object 710 may trigger a scrolling of times indicated by timeline 704 forward in time one week.

Launched time filter tool 610 may further include one or more graphical selectors associated with one or more timelines. In FIG. 7, for example, time filter tool 610 includes a graphical selector 712 displayed in GUI 600 to indicate a position on timeline 702 and a graphical selector 714 displayed in GUI 600 to indicate a position on timeline 704. Graphical selectors 712 and 714 may indicate respective positions on timelines 702 and 704 by being displayed at the respective positions on timelines 702 and 704 as shown in FIG. 7, or in any other suitable way.

A timeline position indicated by a graphical selector corresponds to a particular time within the time period associated with a time line. In FIG. 7, graphical selector 714 is positioned on timeline 704 to indicate the current day of the week, and graphical selector 712 is positioned on timeline 702 to indicate the current time of day. When time filter tool 610 is launched, the initial positions of graphical selectors on their respective timelines may default to positions representing current time information (e.g., the current time of day and/or current day/date).

A user may interact with launched time filter tool 610 by providing touch input in relation to timeline 702 and/or timeline 704. The touch input may include any predefined touch input that may be provided by a user on a touch screen display to interact with timeline 702 and/or timeline 704. For example, touch input may include one or more touch gestures configured to slide one or more graphical selectors 712 and 714 along their respective timelines 702 and 704. To illustrate, a user may touch her finger to graphical selector 712 on the touch screen display and slide her finger along timeline 702 on the touch screen display to cause graphical selector 712 to slide along timeline 702 in accordance with the sliding touch gesture provided by the user. Similarly, the user may touch her finger to graphical selector 714 on the touch screen display and slide her finger along timeline 704 on the touch screen display to cause graphical selector 714 to slide along timeline 704 in accordance with the sliding touch gesture provided by the user. In this or a similar manner, the user may slide graphical selector 712 from its current position to a new position on timeline 702. Additionally or alternatively, the user may slide graphical selector 714 from its current position to a new position on timeline 704.

In response to touch input provided by a user, one or more graphical selectors 712 and 714 may be repositioned along their respective timelines 702 and 704 in GUI 600. The repositioning may be performed in any suitable way and may include displaying graphical selectors 712 and 714 at new positions on their respective timelines 702 and 704 and/or graphically animating a sliding of graphical selectors 712 and 714 along their respective timelines 702 and 704.

A sliding of a graphical selector along a timeline in accordance with a sliding touch gesture provided by a user in relation to the graphical selector is illustrative of a particular manner in which a user may provide touch input to select a particular time to be used as a filter parameter. Other forms of touch input may be employed in other embodiments. For example, instead of providing a sliding touch gesture as described above, a user may simply touch a particular position on a timeline to select the time corresponding to the position. In response to the user touching a position on a timeline, a graphical selector may be repositioned and displayed at the selected position on the timeline.

Figure 8:
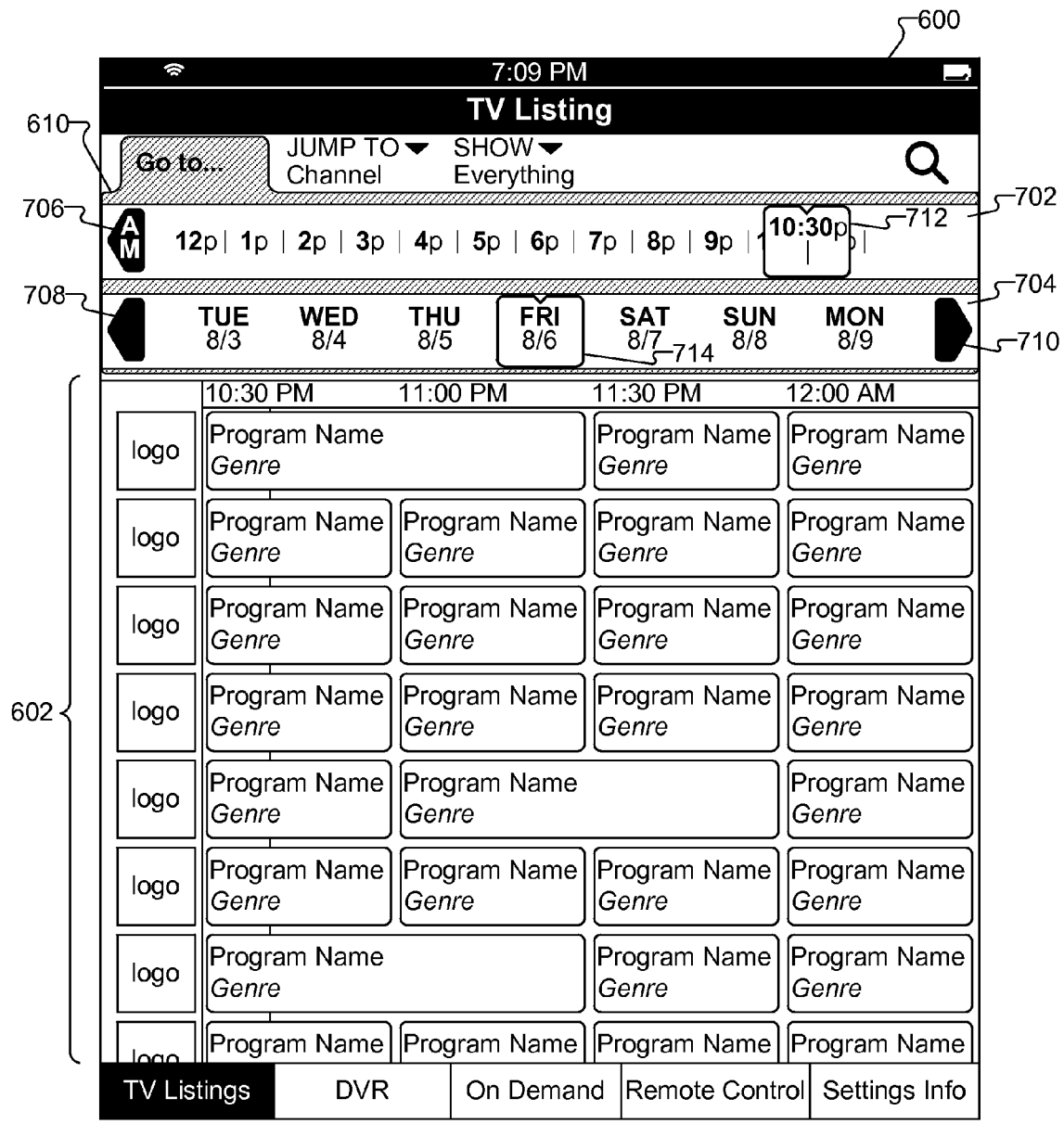

FIG. 8 shows a view of GUI 600 after graphical selectors 712 and 714 have been repositioned and displayed at new respective positions on their respective timelines 702 and 704. In particular, graphical selector 712 has been moved from a first position corresponding to a first time (e.g., 7:09 P.M.) to a second position on timeline 702 that corresponds to a second time (e.g., 10:30 P.M.). Similarly, graphical selector 714 has been moved from a first position corresponding to a first time (e.g., Tuesday) to a second position on timeline 704 that corresponds to a second time (e.g., Friday).

In this or a similar manner, a user may provide touch input to interact with one or more timelines included in time filter tool 610 to select a particular time to be used to filter media content listings. To illustrate, FIG. 8 shows that a particular time (e.g., Friday, August $6^{th}$ at 10:30 P.M.) is to be used to filter media content listings. System 100 may be configured to detect and utilize the selected time to generate one or more time filter parameters that may be applied to identify a set of media content listings that match the time filter parameters. System 100 may be configured to generate time filter parameters based on the selected time in any suitable way as may suit a particular implementation. For example, system 100 may identify a set of media content listings that are scheduled to be transmitted (e.g., broadcast) at the selected time and at subsequent times within a predetermined time period of the selected time (e.g., within a two-hour time block).

The media content listings displayed in section 602 of GUI 600 may be dynamically updated in real time as user input is provided by a user interacting with a filter tool and filter parameters are determined by system 100 based on the user input. For example, when a user moves graphical selectors 712 and 714 to the respective positions shown in FIG. 8 to select a particular time, the media content listings displayed in section 602 of GUI 600 may be dynamically updated to include the set of media content listings identified to match the time filter parameters. FIG. 8 shows a set of media content listings displayed in section 602 that are associated with a selected time (e.g., are within a two-hour time block starting at the selected time). Thus, FIG. 7 shows a first set of media content listings displayed in section 602 that are associated with a first time indicated by the first positions of graphical selectors 712 and 714 on the respective timelines 702 and 704 shown in FIG. 7. This first set of media content listings may be dynamically replaced in section 602 when a user selects a second time by providing touch input configured to cause one or more of the graphical selectors 712 and 714 to be repositioned on their respective timelines 702 and 704 to the positions shown in FIG. 8. FIG. 8 further shows a second set of media content listings that has dynamically replaced the first set of media content listings in section 602 of GUI 600. To further illustrate, the first set of media content listings included in section 602 in FIG. 7 represent media content programs associated with a time block of 7:00 P.M. to 9:00 P.M., while the second set of media content listings included in section 602 in FIG. 8 represent media content programs associated with a time block of 10:30 P.M. to 12:30 A.M.

Figure 9:
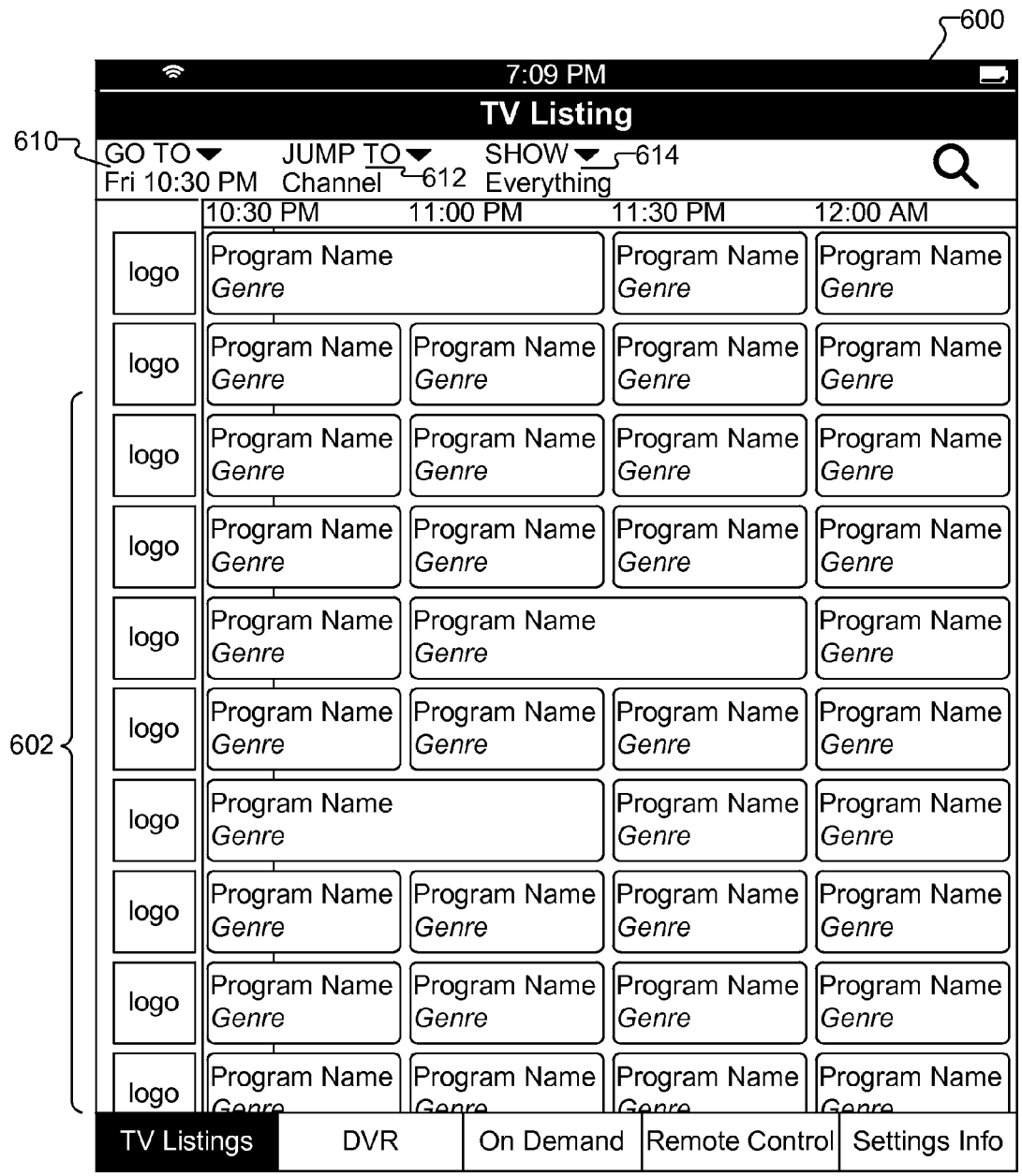

System 100 may be configured to close the launched time filter tool 610 in response to a user providing a predefined touch input. For example, the user may touch her finger to a predefined section of the launched time filter tool 610 (e.g., the tab labeled "Go to . . . " in FIG. 8), and system 100 may respond to the touch input by closing time filter tool 610. FIG. 9 illustrates a view of GUI 600 after time filter tool 610 has been closed.

While the exemplary GUI views shown in FIGS. 7-8 illustrate a time filter tool including a graphical representation of two timelines, this is illustrative only. Other implementations of time filter tool may include one or more timelines indicating any times within any time periods and with which a user may interact to select one or more times to be used by system 100 to access time-filtered media content listings.

Channel filter tool 612 may be utilized by a user to select one or more channel filter parameters to be applied by system 100 to filter media content listings to identify a set of media content listings that match the channel filter parameters. For example, the set of media content listings shown in FIG. 9 may represent media programs that are associated with different channels. In certain examples, a channel may include a virtual channel and/or a physical channel used to deliver media content. A channel may be associated with a particular content provider (e.g., a television content provider such as ABC or ESPN) and may carry media content provided by the content provider. A channel may be part of a channel lineup that is accessible to a television service subscriber.

Figure 10:
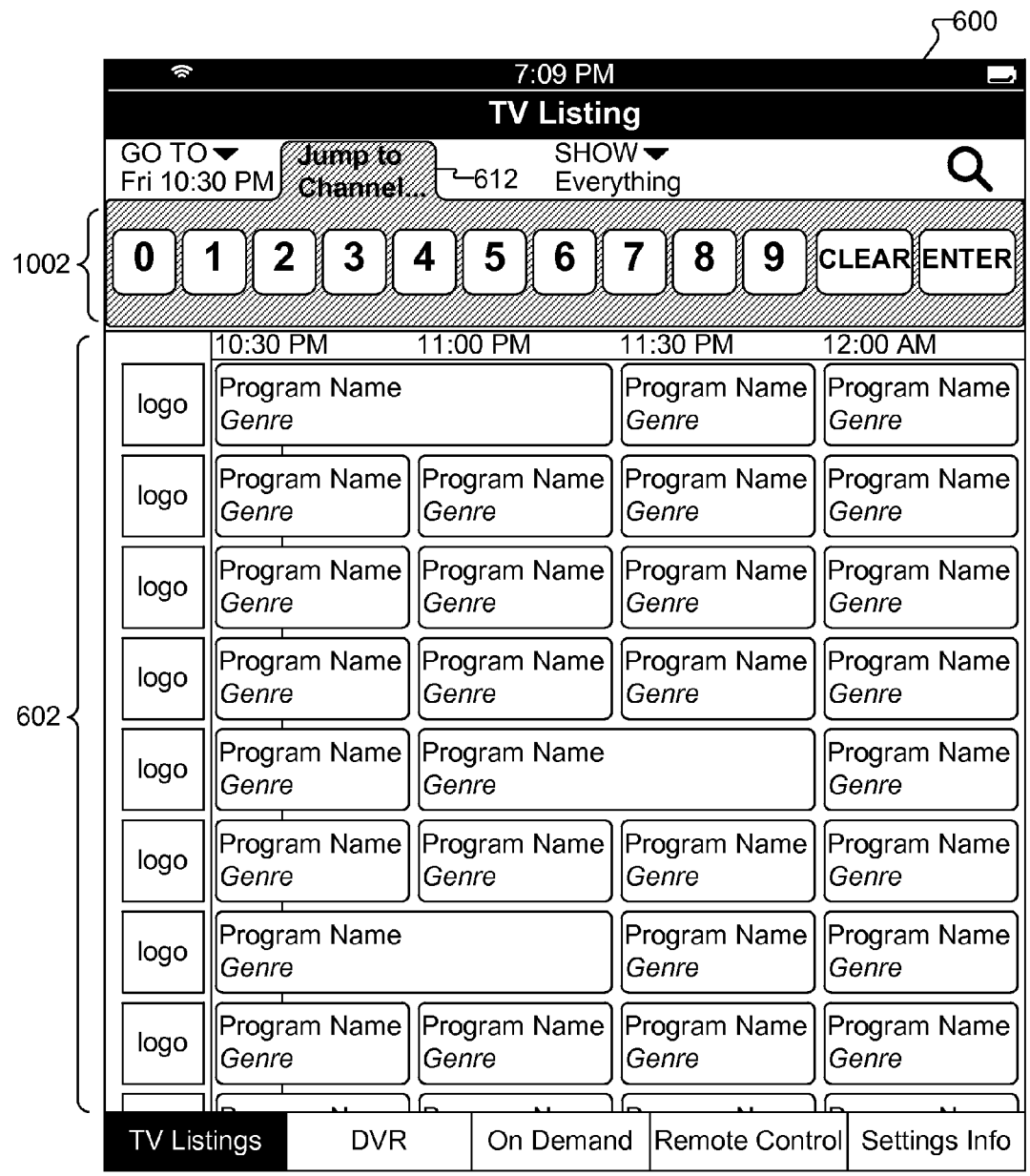

FIG. 10 illustrates another exemplary view of GUI 600 that may be displayed and in which channel filter tool 612 is launched in response to a user selection of channel filter tool 612 shown in FIG. 9. As shown in FIG. 10, section 602 may be resized (e.g., compacted) to allow room for display of the launched channel filter tool 612 together with the media content listings included in section 602.

Launched channel filter tool 612 may include any mechanism that allows a user to interact with channel filter tool 612 to select one or more channels to be used a filter parameters to filter media content listings for display. In FIG. 10, launched channel filter tool 612 includes a graphical representation 1002 of a set of virtual buttons each of which may be selected by a user touching the button on a touch screen display. By selecting a combination of numerical buttons followed by an "enter" button, a user may indicate a particular channel. In response, system 100 may filter media content listings to identify and display a set of media content listings that match the selected channel. For example, a set of media content listings representing media content programs delivered by way of the selected channel may be selected and displayed.

The media content listings displayed in section 602 may be dynamically updated to include the channel-filtered set of media content listings.

Figure 11:
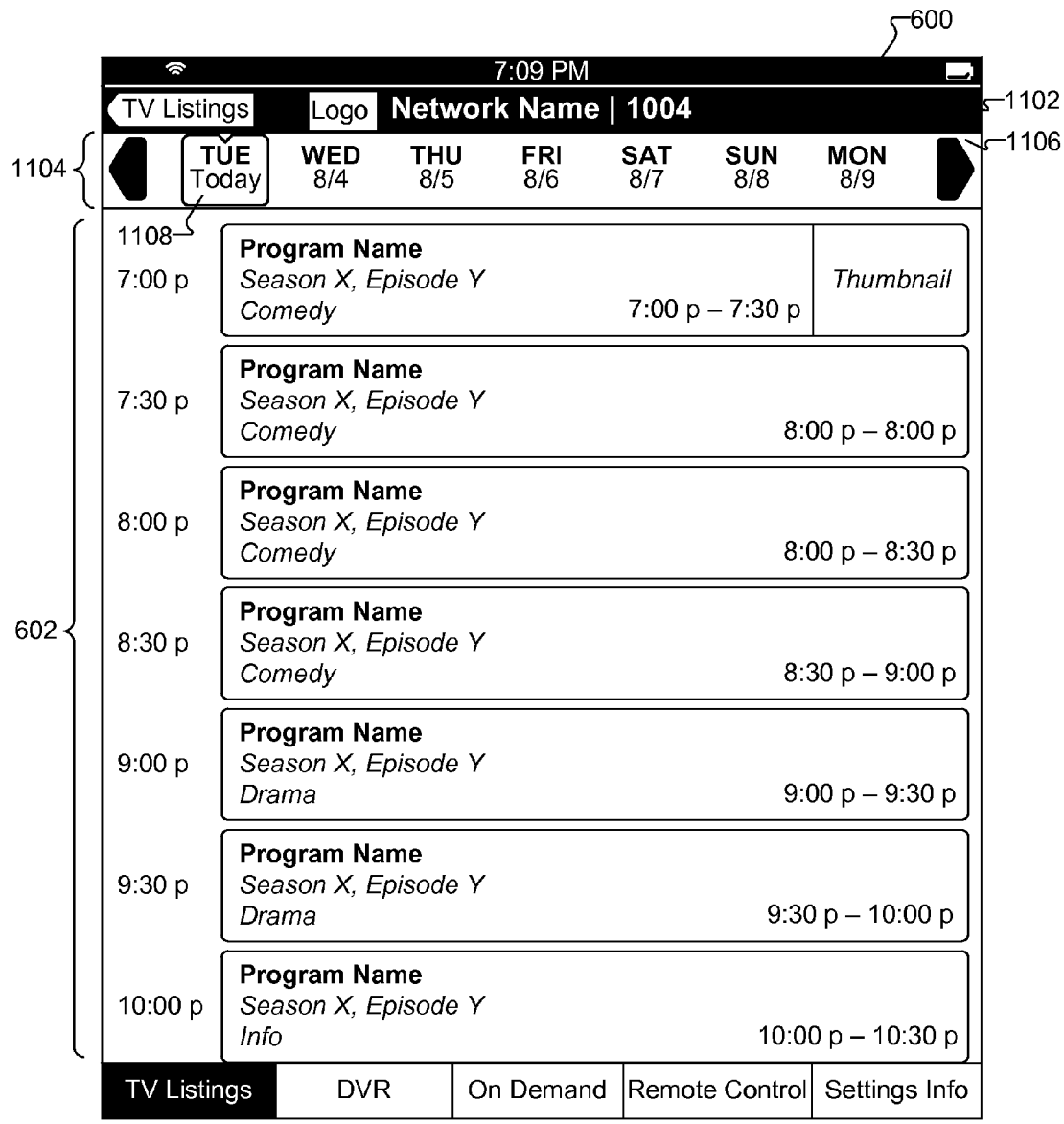

FIG. 11 illustrates another exemplary view of GUI 600 in which section 602 includes a set of media content listings that has been filtered to include only media content listings associated with a single selected channel (e.g., a single television channel). In the illustrated example, the selected channel (e.g., channel number "1004") is associated with a particular network content provider, the name and logo of which may be displayed in a header portion 1102 of GUI 600 as shown. The set of media content listings displayed in section 602 may include at least a portion of a transmission schedule of a network content provider for a given day or for any other time period.

The channel-filtered set of media content listings represented in FIG. 11 may be further filtered by time. For example, FIG. 11 illustrates another launched time filter tool 1104. As shown, time filter tool 1104 may include a graphical representation of a timeline 1106 indicating a set of times within a time period. Timeline 1106 may be associated with any suitable time period and may indicate any times within the time period. In the illustrated example, timeline 1106 indicates a set of times in the form of days of a week and corresponding calendar dates within a weeklong period of time.

Time filter tool 1104 may further include a graphical selector 1108 indicating a position on timeline 1106 that corresponds to a particular time (e.g., Tuesday) within the time period represented by timeline 1106. Accordingly, a user may provide touch input as described above to cause graphical selector 1108 to be repositioned to indicate another position on timeline 1106, thereby selecting another time within the time period represented by timeline 1106. For example, graphical selector 1108 may be repositioned at a position corresponding to another time (e.g., Friday) in response to touch input provided by a user in relation to timeline 1106, and system 100 may respond by dynamically replacing the set of media content listings included in section 602 with a new set of media content listings representing media content programs associated with the selected time (e.g., Friday). In this manner, a user may utilize time filter tool 1104 to navigate channel-specific media content listings by time.

Category filter tool 614 may be utilized by a user to select one or more category filter parameters to be applied by system 100 to filter media content listings to identify a set of media content listings that match the category filter parameters. For example, the set of media content listings shown in FIG. 6 may represent media programs that are associated with all available categories of television listings. This is indicated by category filter tool 614 indicting that the selected category is named "everything." A user may provide input to select category filter tool 614, and system 100 may respond by launching category filter tool 614.

Figure 12:
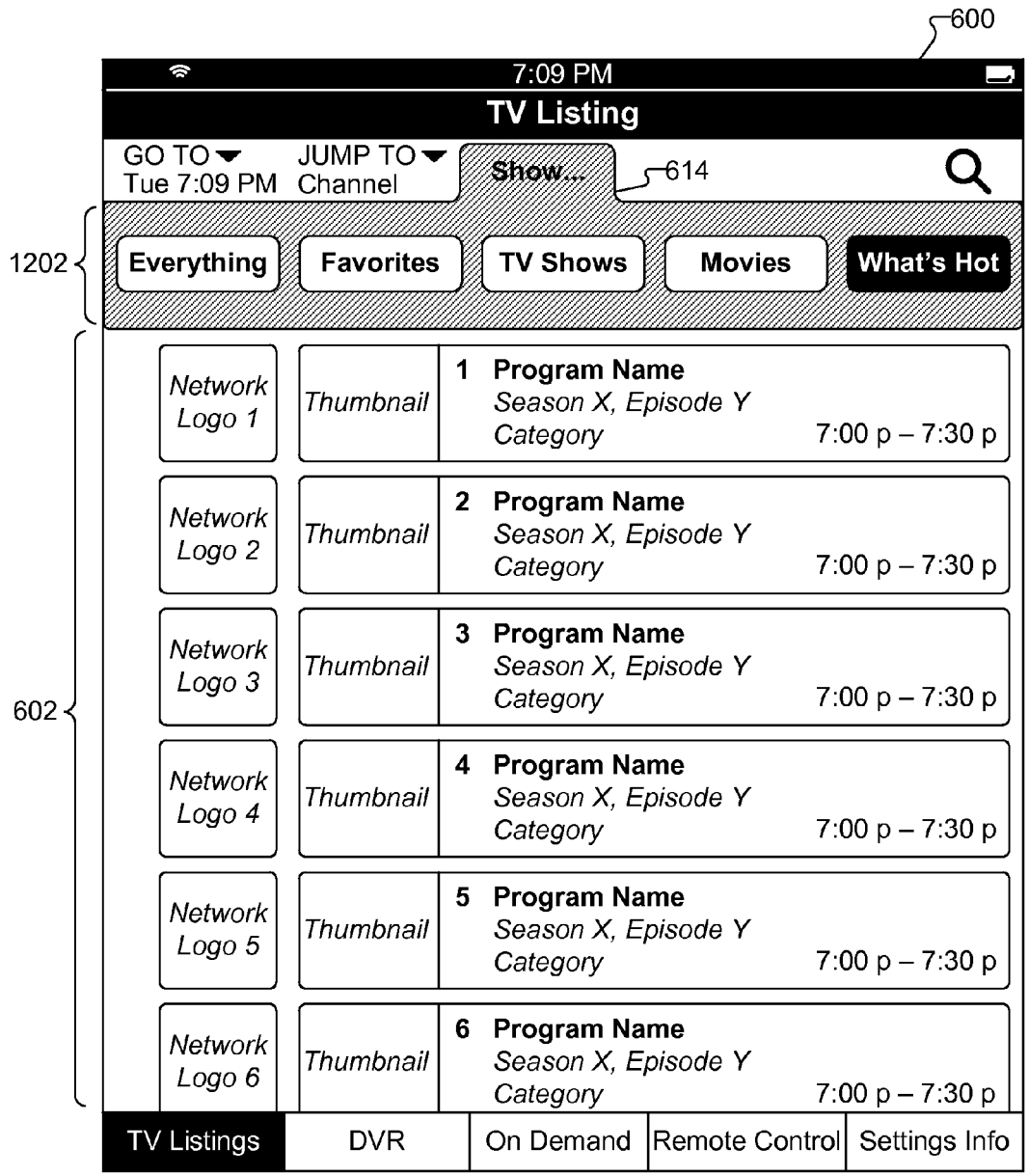

FIG. 12 illustrates another exemplary view of GUI 600 that may be displayed and in which category filter tool 614 is launched in response to a user selection of category filter tool 614 shown in FIG. 6. As shown in FIG. 12, section 602 may be resized (e.g., compacted) to allow room for display of the launched category filter tool 614 together with the media content listings included in section 602.

Launched category filter tool 614 may include any mechanism that allows a user to interact with category filter tool 614 to select one or more media content categories to be used as filter parameters to filter media content listings for display. In FIG. 12, launched category filter tool 614 includes a graphical representation 1202 of a set of virtual buttons each of which may be selected by a user touching the button on a touch screen display. As shown, each virtual button may indicate a particular media content category associated with the button. In the illustrated example, the virtual buttons are associated with categories labeled "everything," "favorites," "TV shows," "movies," and "what's hot." The "what's hot" category may include media content programs that are determined to be most popular in comparison to other media content programs. Popularity of a media content program may be determined based on any suitable criteria, such as a number of devices accessing the media content program at a given time, end-user ratings of the media content program, a number of end-users who have marked the media content program as a "favorite," and/or any other criteria. In certain implementations, the popularity of media content programs relative to one another may be based on a sampling of select media content processing devices to determine which of the media content programs are most accessed. The "movies" category may include media content programs labeled "movies," the "TV shows" category may include media content programs labeled "TV shows", the "favorites" category may include media content programs that have been labeled as "favorite" programs by one or more users, and the "everything" category may include all categories of media content programs.

A user may provide touch input to select a virtual button to indicate a particular category. In response, system 100 may filter media content listings to identify and display a set of media content listings that match the selected category. For example, a set of media content listings representing media content programs within a selected category may be identified and displayed. The media content listings displayed in section 602 may be dynamically updated to include the category-filtered set of media content listings.

Figure 13:
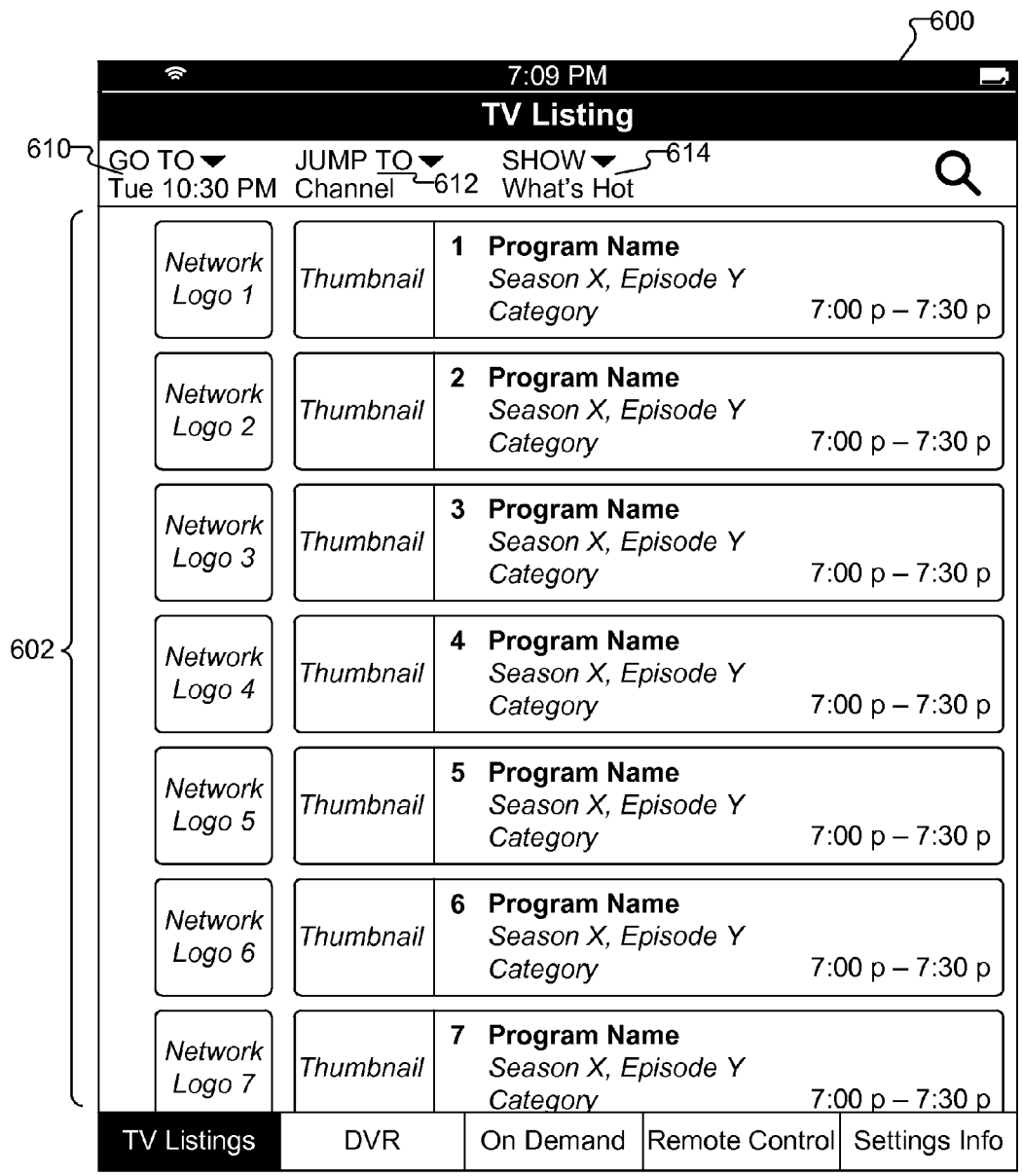

FIG. 12 illustrates a user selection of the "what's hot" category button in category filter tool 614 and a dynamic updating of section 602, in response to the user selection, to include media content listings representing a list of most popular media content programs transmitted during a given time slot (e.g., 7:00-7:30 P.M.). In addition, system 100 may close the launched category filter tool 614 in response to the user selection of the "what's hot" category button in category filter tool 614. FIG. 13 illustrates a view of GUI 600 after the "what's hot" category button has been selected by a user, the media content listings in section 602 have been updated based on the selection, and the category filter tool 614 has been closed. As shown, section 602 may expand in size to occupy screen area previously occupied by the launched category filter tool 614.

Figure 14:
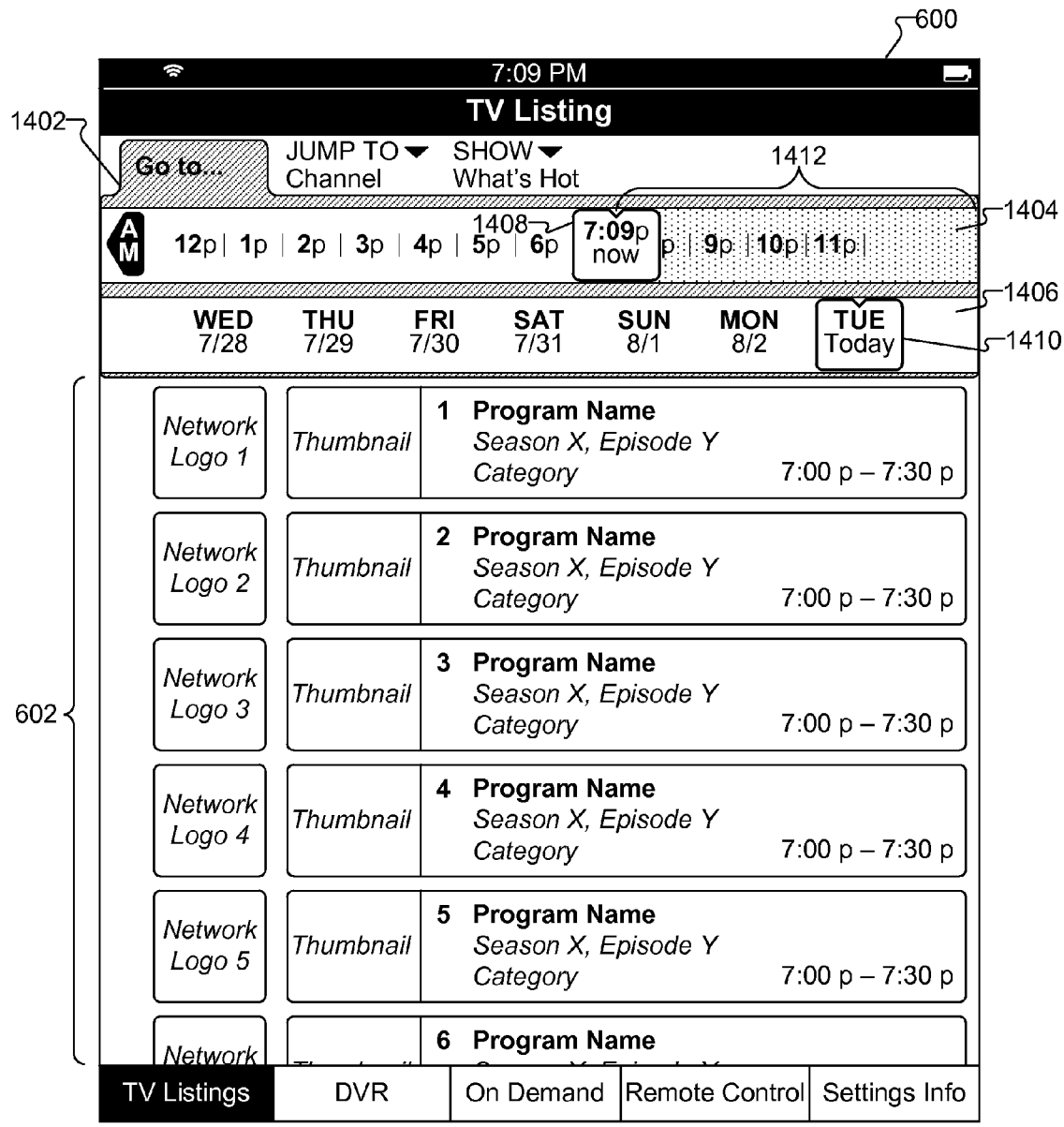

The category-filtered set of media content listings displayed in FIG. 13 may be further filtered by time. For example, a user may provide touch input to select and launch time filter tool 610. FIG. 14 illustrates a time filter tool 1402 that may be launched and displayed in GUI 600 together with a set of most popular media content instances that are displayed in section 602. As shown in FIG. 14, launched time filter tool 1402 may include a graphical representation of one or more timelines. In FIG. 14, time filter tool 1402 includes a graphical representation of two timelines—a first timeline 1404 indicating a first set of times within a time period and a second timeline 1406 indicating a second set of times within another period of time. Each of the timelines 1404 and 1406 may be associated with any suitable time period (e.g., twelve hours, a day, a week, etc.) and may indicate any times within the time period. In the illustrated example, timeline 1404 indicates a first set of times in the form of times of day (e.g., hours within a day and/or a current time of day) within an approximately twelve hour period of time, and timeline 1406 indicates a second set of times in the form of days of a week and corresponding calendar dates within a weeklong period of time.

Launched time filter tool 1402 may further include one or more graphical selectors associated with one or more timelines. In FIG. 14, for example, time filter tool 1402 includes a graphical selector 1408 displayed in GUI 600 to indicate a position on timeline 1404 and a graphical selector 1410 displayed in GUI 600 to indicate a position on timeline 1406. Graphical selectors 1408 and 1410 may indicate respective positions on timelines 1404 and 1406 by being displayed at the respective positions on timelines 1404 and 1406 as shown in FIG. 14, or in any other suitable way.

A timeline position indicated by a graphical selector corresponds to a particular time within the time period associated with a timeline. In FIG. 14, graphical selector 1410 is positioned on timeline 1406 to indicate the current day of the week, and graphical selector 1408 is positioned on timeline 1404 to indicate the current time of day.

A user may interact with launched time filter tool 1402 by providing touch input in relation to timeline 1404 and/or timeline 1406. The touch input may include any predefined touch input that may be provided by a user on a touch screen display to interact with timeline 1404 and/or timeline 1406, including any of the examples of touch input described above. For example, touch input may include one or more touch gestures configured to slide one or more graphical selectors 1408 and 1410 along their respective timelines 1404 and 1406, as described above.

In response to touch input provided by a user, one or more graphical selectors 1408 and 1410 may be repositioned along their respective timelines 1404 and 1406 in GUI 600. The repositioning may be performed in any suitable way and may include displaying graphical selectors 1408 and 1410 at new positions on their respective timelines 1404 and 1406 and/or graphically animating a sliding of graphical selectors 1408 and 1410 along their respective timelines 1404 and 1406.

Figure 15:
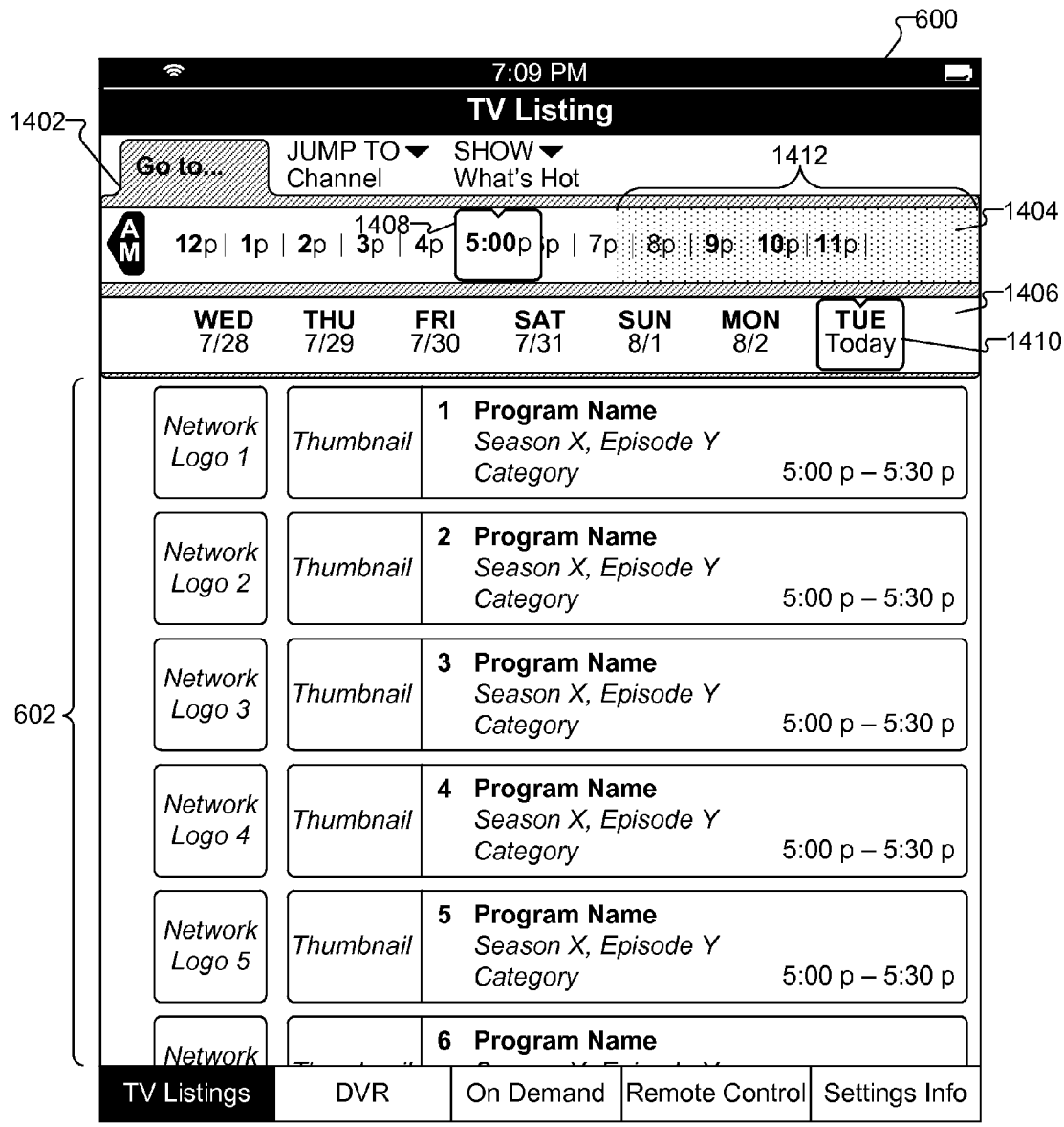

FIG. 15 shows a view of GUI 600 after graphical selector 1408 has been repositioned and displayed at a new position on timeline 1404. In particular, graphical selector 1408 has been moved from a first position corresponding to a first time (e.g., 7:09 P.M.) to a second position on timeline 1404 that corresponds to a second time (e.g., 5:00 P.M.). Graphical selector 1410 remains at the same position on timeline 1406 that corresponds with the same time (e.g., Friday) shown in FIG. 14.

In this or a similar manner, a user may provide touch input to interact with one or more timelines included in time filter tool 1402 to select a particular time to be used to filter media content listings associated with popular media content programs. To illustrate, FIG. 15 shows that a particular time (e.g., Tuesday, August $3^{rd}$ at 5:00 P.M.) is to be used to filter media content listings. System 100 may be configured to detect and utilize the selected time to generate one or more time filter parameters that may be applied to identify a set of media content listings that match the time filter parameters. System 100 may be configured to generate time filter parameters based on the selected time in any suitable way as may suit a particular implementation. For example, system 100 may identify a set of most popular media content listings transmitted (e.g., broadcast) at the selected time.

The media content listings displayed in section 602 of GUI 600 may be dynamically updated in real time in response to user input provided by a user interacting with a filter tool and a determination of filter parameters by system 100 based on the user input. For example, when a user moves graphical selector 1408 to the position shown in FIG. 15 to select a particular time, the media content listings displayed in section 602 of GUI 600 may be dynamically updated to include the set of media content listings identified to match the time filter parameters determined based on the selected time. FIG. 15 shows a set of media content listings displayed in section 602 that are associated with a selected time (e.g., were transmitted at the selected time) and that represent a set of media content programs that were the most popular media content programs transmitted at the selected time. Thus, FIG. 14 shows a first set of popular media content listings displayed in section 602 that are associated with a first time indicated by the positions of graphical selectors 1408 and 1410 on the respective timelines 1404 and 1406 in FIG. 14. This first set of media content listings may be dynamically replaced in section 602 when a user selects a second time by providing touch input configured to cause one or more of the graphical selectors 1408 and 1410 to be repositioned on their respective timelines 1404 and 1406. FIG. 15 shows a second set of popular media content listings that has dynamically replaced the first set of popular media content listings in section 602 of GUI 600. The first set of media content listings included in section 602 in FIG. 14 represents a set of most popular media content programs associated with a 7:00 P.M. to 7:30 P.M. time slot, and the second set of media content listings included in section 602 in FIG. 15 represents a set of most popular media content programs associated with a 5:00 P.M. to 5:30 P.M. time slot.

In this manner, a user may interact with time filter tool 1402 to select a time, and system 100 may identify and display a set of media content listings representing the most popular (e.g., most accessed) media content programs at the selected time. For example, the user may interact with time filter tool 1402 as described above to select the time corresponding to the positions of graphical selectors 1408 and 1410, and system 100 may respond by dynamically identifying and displaying a list of most media content listings representing the most popular media content programs associated with the selected time.

One or more segments of timelines included in a time filter tool may be distinguished from other segments of the timelines to indicate one or more properties associated with the timeline segments. To illustrate, FIGS. 14-15 show a segment 1412 of timeline 1404 that is visually distinguished from the remainder of timeline 1404. In certain examples, segment 1412 may include times that are in the future of the current time and for which popularity data is unavailable. Accordingly, segment 1412 may be visually indicated (e.g., blacked or grayed out) to notify a user of an unavailability of popularity data for times within segment 1412.

In certain embodiments, system 100 may be configured to associate historical popularity data with future times within segment 1412. For example, if a user provides input to select a future time within segment 1412 (e.g., a time within segment 1412), system 100 may identify the selected time and historical popularity data that may be relevant to the selected time. For instance, system 100 may identify and access popularity data for a historical time that is a week earlier than the selected future time. The week-old popularity data may be relevant to the selected future time at least because episodes of certain media content programs tend to be scheduled for transmission at the same time each week. Thus, if a user provides touch input to move graphical selector 1408 to a future time (e.g., 8:00 P.M.) within segment 1412 of timeline 1404, system 100 may access historical popularity data associated with the same time one week earlier.

The filter tools illustrated in FIGS. 6-15 may be used alone or in combination to select one or more filter parameters to be used by system 100 to identify a filtered set of media content instances for display in GUI 600. For example, a user may utilize filter tool 608, time filter tool 610, channel filter tool 612, category filter tool 614, or any combination or subcombination thereof to select one or more filter parameters to be applied by system 100 to dynamically identify and display a set of matching media content programs.

Figure 16:
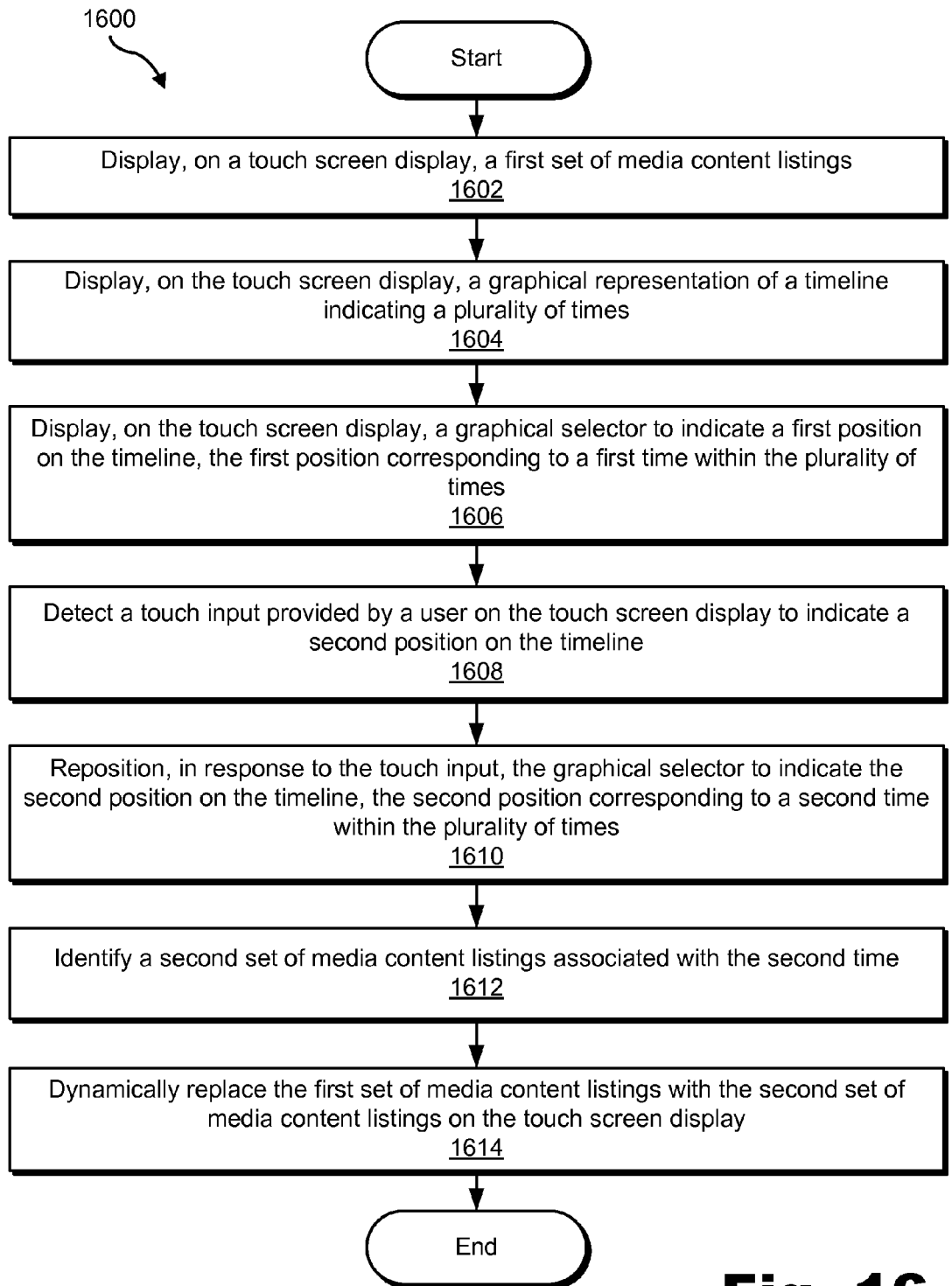
FIG. 16 illustrates an exemplary method of a user interface facilitating access to media content listings according to principles described herein.

FIG. 16 illustrates an exemplary method 1600 of a user interface facilitating access to media content listings according to principles described herein. While FIG. 16 illustrates exemplary steps according to one embodiment, other embodiments may omit, add to, reorder, combine, repeat, and/or modify any of the steps shown in FIG. 16. The steps shown in FIG. 16 may be performed by any component or combination of components of system 100 and/or one or more devices implementing system 100.

In step 1602, a first set of media content listings may be displayed on a touch screen display, as described herein.

In step 1604, a graphical representation of a timeline indicating a plurality of times may be displayed on the touch screen display. The graphical representation of the timeline may be displayed together with the first set of media content listings on the touch screen display, or in any other suitable way.

In step 1606, a graphical selector may be displayed on the touch screen display to indicate a first position on the timeline. The first position may correspond to a first time within the plurality of times indicated by the timeline. The graphical selector may be displayed together with the timeline on the touch screen display, or in any other suitable way.

In step 1608, a touch input provided by a user on the touch screen display to indicate a second position on the timeline may be detected. The touch input may be provided by the user in any suitable way, including in any of the ways described herein.

In step 1610, the graphical selector may be repositioned, in response to the touch input detected in step 1608, to indicate the second position on the timeline. The second position on the timeline may correspond to a second time within the plurality of times indicated by the timeline.

In step 1612, a second set of media content listings associated with the second time may be identified. Step 1612 may be performed in any of the ways described above.

In step 1614, the first set of the media content listings may be dynamically replaced with the second set the media content listings on the touch screen display. Step 1614 may be performed in any of the ways described above, including by dynamically updating the media content listings included in section 602 of GUI 600.

One or more of the step shown in FIG. 16 may be repeated. For example, one or more of the steps shown in FIG. 16 may be repeated for an additional timeline included in a time filter tool, as described above. Additionally or alternatively, one or more other filter parameters may be applied to identify the second set of media content listings matching the filter parameters, as described herein.

Figure 17:
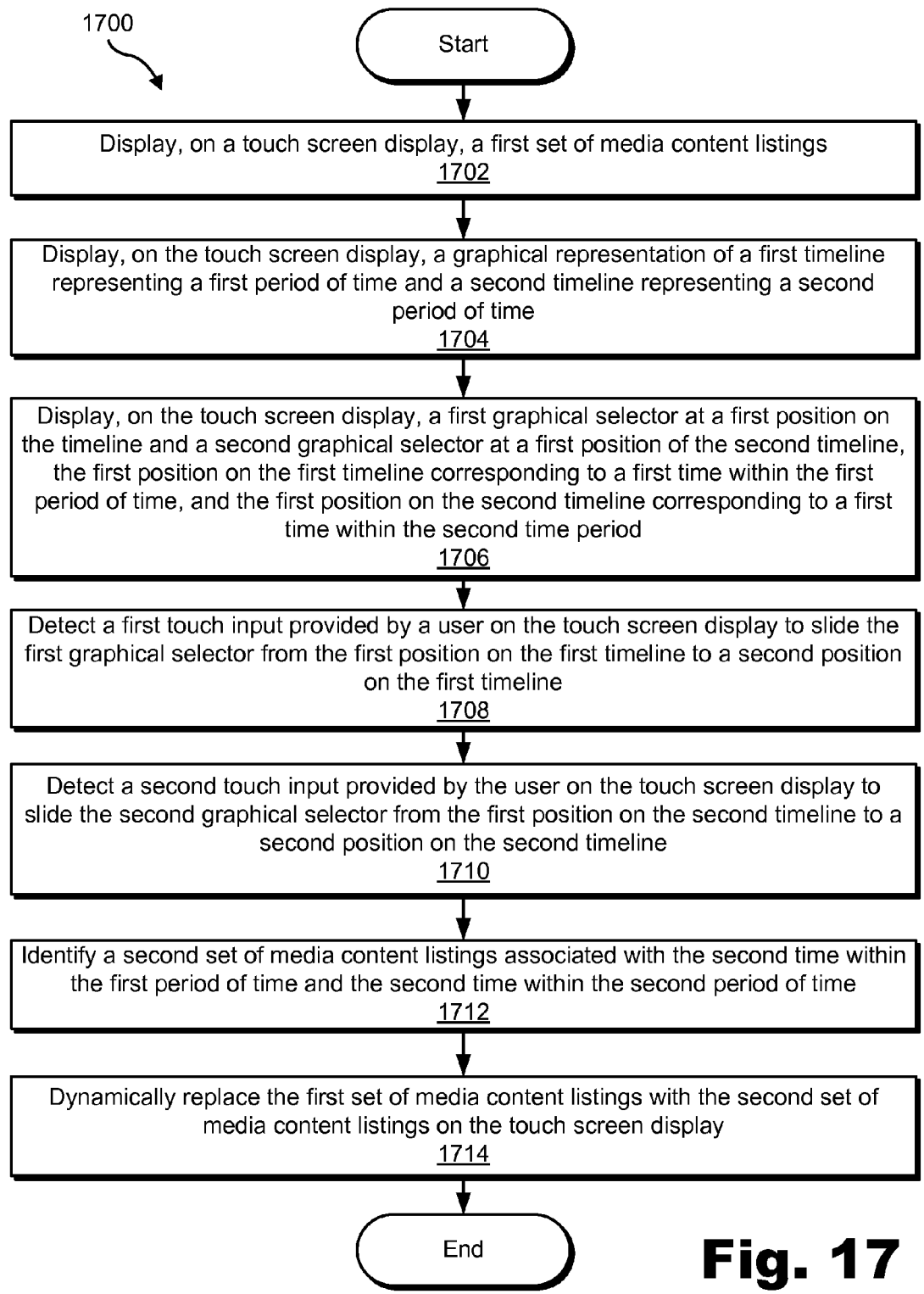
FIG. 17 illustrates another exemplary method of a user interface facilitating access to media content listings according to principles described herein.

FIG. 17 illustrates another exemplary method 1700 of a user interface facilitating access to media content listings according to principles described herein. While FIG. 17 illustrates exemplary steps according to one embodiment, other embodiments may omit, add to, reorder, combine, repeat, and/or modify any of the steps shown in FIG. 17. The steps shown in FIG. 17 may be performed by any component or combination of components of system 100 and/or one or more devices implementing system 100.

In step 1702, a first set of media content listings may be displayed on a touch screen display, as described herein.

In step 1704, a graphical representation of a first timeline representing a first period of time and a graphical representation of a second timeline representing a second period of time may be displayed on the touch screen display. The graphical representation of the first timeline and the second timeline may be displayed together with the first set of media content listings on the touch screen display, or in any other suitable way.

In step 1706, a first graphical selector may be displayed on the touch screen display at a first position on the first timeline and a second graphical selector may be displayed on the touch screen display at a first position on the second timeline. The first position on the first timeline may correspond to a first time within the first period of time represented by the first timeline, and the first position on the second timeline may correspond to a first time within the second period of time represented by the second timeline. The graphical selectors may be displayed together with the timelines on the touch screen display, or in any other suitable way.

In step 1708, a first touch input provided by a user on the touch screen display to slide the first graphical selector from the first position on the first timeline to a second position on the first timeline may be detected. The first touch input may be provided by the user in any suitable way, including in any of the ways described herein.

In step 1710, a second touch input provided by a user on the touch screen display to slide the second graphical selector from the first position on the second timeline to a second position on the second timeline may be detected. The second touch input may be provided by the user in any suitable way, including in any of the ways described herein.

In step 1712, a second set of media content listings associated with the second time within the first time period and the second time within the second time period may be identified. Step 1712 may be performed in any of the ways described above, including by using the second time within the first time period and the second time within the second time period to generate one or more time filter parameters to be applied to filter an overall set of media content listings to identify the second set of media content listings.

In step 1714, the first set of the media content listings may be dynamically replaced with the second set the media content listings on the touch screen display. Step 1714 may be performed in any of the ways described above, including by dynamically updating the media content listings included in section 602 of GUI 600.

In certain examples, one or more other filter parameters may be applied to identify the second set of media content listings matching the filter parameters, as described herein.

In certain embodiments, one or more of the components and/or processes described herein may be implemented and/or performed by one or more appropriately configured computing devices (e.g., one or more communication devices). To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include any number of computing devices, and may employ and/or interface with any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 18:
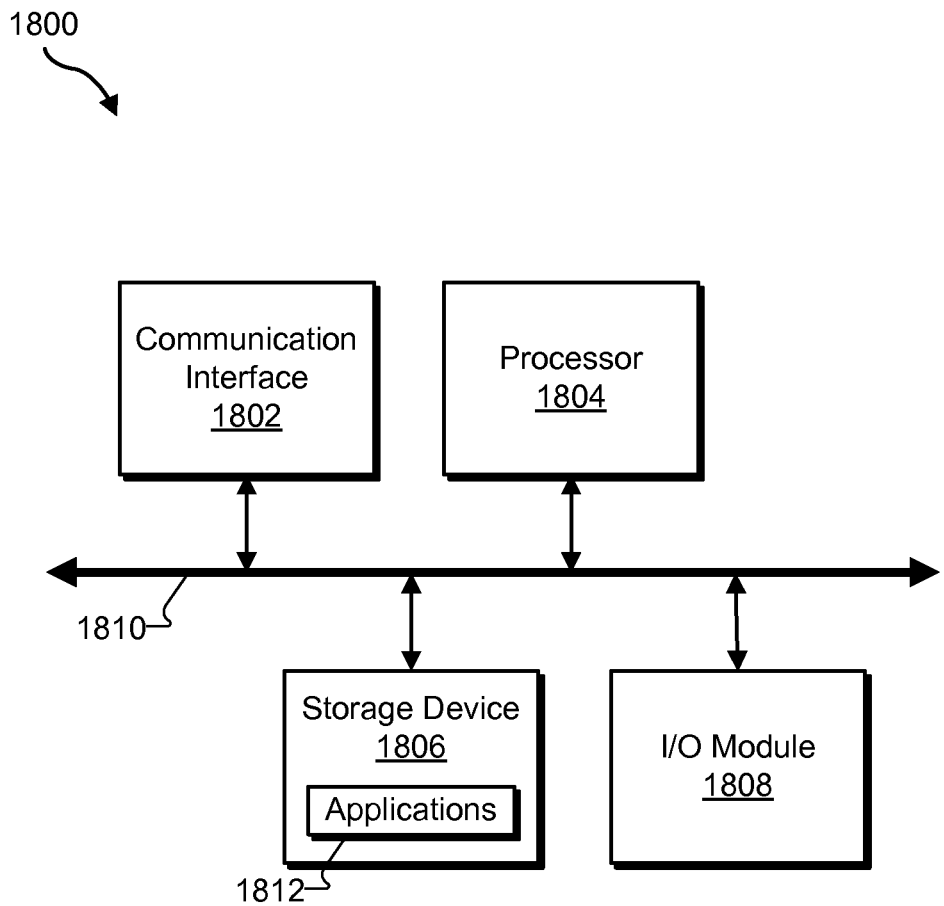
FIG. 18 illustrates an exemplary computing device according to principles described herein.

FIG. 18 illustrates an exemplary computing device 1800 that may be configured to perform one or more of the processes described herein. As shown in FIG. 18, computing device 1800 may include a communication interface 1802, a processor 1804, a storage device 1806, and an input/output ("I/O") module 1808 communicatively connected via a communication infrastructure 1810. While an exemplary computing device 1800 is shown in FIG. 18, the components illustrated in FIG. 18 are not intended to be limiting. Additional or alternative components may be used in other embodiments. Components of computing device 1800 shown in FIG. 18 will now be described in additional detail.

Communication interface 1802 may be configured to communicate with one or more computing devices. Examples of communication interface 1802 include, without limitation, a wired network interface (such as a network interface card), a wireless network interface (such as a wireless network interface card), a communications medium interface, a modem, and any other suitable interface. Communication interface 1802 may be configured to interface with any suitable communication media, protocols, and formats, including any of those mentioned above.

Processor 1804 generally represents any type or form of processing unit capable of processing data or interpreting, executing, and/or directing execution of one or more of the instructions, processes, and/or operations described herein. Processor 1804 may direct execution of operations in accordance with one or more applications 1812 or other computer-executable instructions such as may be stored in storage device 1806 or another computer-readable medium.

Storage device 1806 may include one or more data storage media, devices, or configurations and may employ any type, form, and combination of data storage media and/or device. For example, storage device 1806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1806. For example, data representative of one or more executable applications 1812 (which may include, but are not limited to, one or more of the software applications described herein) configured to direct processor 1804 to perform any of the operations described herein may be stored within storage device 1806.

I/O module 1808 may be configured to receive user input and provide user output and may include any hardware, firmware, software, or combination thereof supportive of input and output capabilities. For example, I/O module 1808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1800. For example, one or more applications 1812 residing within storage device 1806 may be configured to direct processor 1804 to perform one or more processes or functions associated with access facility 102 and/or user interface facility 104. Likewise, storage facility 106 may be implemented by or within storage device 1806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
displaying, by a media content information system on a touch screen display, a first set of media content listings;
displaying, by the media content information system together with the media content listings on the touch screen display, a plurality of filter tools, the plurality of filter tools including at least a time filter tool;
displaying, by the media content information system together with the media content listings on the touch screen display and in response to a user selection of the time filter tool, a graphical representation of a timeline indicating a plurality of times and of a selector object, selectable by a user, to select the plurality of times represented in the graphical representation of the timeline and an additional graphical representation of an additional timeline indicating a different plurality of times and of an additional selector object, selectable by the user, to select the different plurality of times represented in the additional timeline, wherein the timeline and the additional timeline are positioned horizontally in the touch screen display;
displaying, by the media content information system together with the graphical representation of the timeline on the touch screen display, a graphical selector to indicate a first position on the timeline, the first position corresponding to a first time selected by the user within the plurality of times represented in the graphical representation of the timeline;

detecting, by the media content information system, a touch input provided by the user on the touch screen display to indicate a second position on the timeline;

repositioning, by the media content information system in response to the touch input, the graphical selector to indicate the second position on the timeline, the second position corresponding to a second time within the plurality of times;

identifying, by the media content information system, a second set of media content listings associated with the second time; and dynamically replacing, by the media content information system, the first set of media content listings with the second set of media content listings on the touch screen display.

2. The method of claim 1, wherein the touch input comprises a touch gesture that slides the graphical selector from the first position to the second position on the timeline.

3. The method of claim 1, wherein:
the first set of media content listings represents a first set of most popular media content programs associated with the first time; and
the second set of media content listings represents a second set of most popular media content programs associated with the second time.

4. The method of claim 1, wherein:
the first set of media content listings represents a first set of television programs associated with the first time; and
the second set of media content listings represents a second set of television programs associated with the second time.

5. The method of claim 4, wherein the first set of television programs and the second set of television programs are associated with only a single television channel.

6. The method of claim 1, further comprising:
displaying, by the media content information system together with the graphical representation of the additional timeline on the touch screen display, an additional graphical selector to indicate a first position on the additional timeline, the first position on the additional timeline corresponding to a first time selected by the user within the different plurality of times represented by the additional timeline;
detecting, by the media content information system, an additional touch input provided by the user on the touch screen display to indicate a second position on the additional timeline; and
repositioning, by the media content information system in response to the additional touch input, the additional graphical selector to indicate the second position on the additional timeline, the second position corresponding to a second time within the different plurality of times;
wherein the identifying of the second set of media content listings includes determining that the second set of media content listings is associated with both the second time within the plurality of times and the second time within the different plurality of times.

7. The method of claim 6, wherein:
the plurality of times comprises days of a week; and
the different plurality of times comprises times of day.

8. The method of claim 6, wherein:
the plurality of times comprises times of day; and
the different plurality of times comprises days of a week.

9. The method of claim 1, wherein the plurality of times comprises days of a week, dates, or times of day.

10. The method of claim 1, wherein the identifying the second set of media content listings comprises:
generating at least one time filter parameter based on the second time; and
using the at least one time filter parameter to filter an overall set of media content listings to identify the second set of media content listings matching the at least one filter parameter.

11. The method of claim 10, further comprising using, by the media content information system, at least one channel filter parameter to further filter the overall set of media content listings to identify the second set of media content listings.

12. The method of claim 10, further comprising using, by the media content information system, at least one category filter parameter to further filter the overall set of media content listings to identify the second set of media content listings.

13. The method of claim 1, wherein the timeline and the additional timeline are positioned one above another in the touch screen display.

14. The method of claim 1, wherein the timeline and the additional timeline are positioned horizontally along a width of the touch screen display.

15. The method of claim 1, embodied as computer-executable instructions on at least one non-transitory computer-readable medium.

16. A method comprising:
displaying, by a media content information system on a touch screen display, a first set of media content listings;
displaying, by the media content information system together with the media content listings on the touch screen display, a plurality of filter tools, the plurality of filter tools including at least a time filter tool;
displaying, by the media content information system together with the media content listings on the touch screen display and in response to a user selection of the time filter tool, a graphical representation of a first timeline representing a first period of time, of a first selector object, selectable by a user, to select the first period of time represented in the graphical representation of the first timeline, of a second timeline representing a second period of time, and of a second selector object, selectable by the user, to select the second period of time represented in the graphical representation of the second timeline, wherein the first timeline representing the first period of time and the second timeline representing the second period of time are positioned horizontally in the touch screen display;
displaying, by the media content information system together with the graphical representation of the first timeline and the second timeline on the touch screen display, a first graphical selector at a first position on the first timeline and a second graphical selector at a first position on the second timeline, the first position on the first timeline corresponding to a first time selected by the user via the first selector object, the first time included within the first period of time represented in the graphical representation of the first timeline, and the first position on the second timeline corresponding to a first time within the second period of time;
detecting, by the media content information system, a first touch gesture provided by a user on the touch screen display to slide the first graphical selector from the first position on the first timeline to a second position on the first timeline; detecting, by the media content information system, a second touch gesture provided by the user on the touch screen display to slide the second graphical selector from the first position on the second timeline to a second position on the second timeline;

identifying, by the media content information system, a second set of media content listings associated with the second time within the first period of time and the second time within the second period of time; and dynamically replacing, by the media content information system, the first set of media content listings with the second set of media content listings on the touch screen display.

17. The method of claim 16, embodied as computer-executable instructions on at least one non-transitory computer-readable medium.

18. A system comprising:

a user interface facility configured to display, on a touch screen display, a first set of media content listings, display, together with the media content listings on the touch screen display, a plurality of filter tools, the plurality of filter tools including at least a time filter tool;

display, together with the media content listings on the touch screen display and in response to a user selection of the time filter tool, a graphical representation of a timeline indicating a plurality of times and of a selector object, selectable by a user, to select the plurality of times represented in the graphical representation of the timeline and an additional graphical representation of an additional timeline indicating a different plurality of times and of an additional selector object, selectable by the user, to select the different plurality of times represented in the additional timeline, wherein the timeline and the additional timeline are positioned horizontally in the touch screen display, display, together with the graphical representation of the timeline on the touch screen display, a graphical selector to indicate a first position on the timeline, the first position corresponding to a first time selected by the user within the plurality of times represented in the graphical representation of the timeline, detect a touch input provided by the user on the touch screen display to indicate a second position on the timeline, and reposition, in response to the touch input, the graphical selector to indicate the second position on the timeline, the second position corresponding to a second time within the plurality of times; and a media content listings access facility communicatively coupled to the user interface facility and configured to identify a second set of media content listings associated with the second time;

wherein the user interface facility is further configured to dynamically replace the first set of media content listings with the second set of media content listings on the touch screen display.

19. The system of claim 18, wherein the touch input comprises a touch gesture that slides the graphical selector from the first position to the second position on the timeline.

20. The system of claim 18, wherein:

the first set of media content listings represents a first set of most popular media content programs associated with the first time; and the second set of media content listings represents a second set of most popular media content programs associated with the second time.

21. The system of claim 18, wherein:

the first set of media content listings represents a first set of television programs associated with the first time; and the second set of media content listings represents a second set of television programs associated with the second time.

22. The system of claim 21, wherein the first set of television programs and the second set of television programs are associated with only a single television channel.

23. The system of claim 18, wherein:

the user interface facility is further configured to display, together with the graphical representation of the additional timeline on the touch screen display, an additional graphical selector to indicate a first position on the additional timeline, the first position on the additional timeline corresponding to a first time selected by the user within the different plurality of times represented by the additional timeline, detect an additional touch input provided by the user on the touch screen display to indicate a second position on the additional timeline, and reposition, in response to the additional touch input, the additional graphical selector to indicate the second position on the additional timeline, the second position corresponding to a second time within the different plurality of times; and the media content listings access facility is configured to identify the second set of media content listings by determining that the second set of media content listings is associated with both the second time within the plurality of times and the second time within the different plurality of times.

24. The system of claim 18, wherein the media content listings access facility is configured to identify the second set of media content listings by:

generating at least one time filter parameter based on the second time; and using the at least one time filter parameter to filter an overall set of media content listings to identify the second set of media content listings.

* * * * *